United States Patent [19]

Noda et al.

[11] Patent Number: 5,539,771
[45] Date of Patent: Jul. 23, 1996

[54] COMMUNICATION LINE DRIVER, LSI FOR INTERFACE INCLUDING SUCH A CIRCUIT AND COMMUNICATION TERMINAL APPARATUS

[75] Inventors: Takaaki Noda, Higashimurayama; Shigeyuki Hashimoto, Ibaraki-ken, both of Japan

[73] Assignees: Hitachi, Ltd., Tokyo; Hitachi Engineering Co., Ltd., Ibaraki-ken, both of Japan

[21] Appl. No.: 178,408

[22] Filed: Jan. 6, 1994

[30] Foreign Application Priority Data

Jan. 12, 1993 [JP] Japan .................... 5-019643

[51] Int. Cl.[6] .................................... H04L 25/49
[52] U.S. Cl. .................... 375/219; 327/545; 327/535; 327/534; 307/11
[58] Field of Search .............. 375/219; 327/545, 327/535, 534, 536, 551; 307/24, 149, 156, 11

[56] References Cited

U.S. PATENT DOCUMENTS

| | | | |
|---|---|---|---|
| 4,675,557 | 6/1987 | Huntington | 307/475 |
| 4,833,341 | 5/1989 | Watanabe et al. | 307/296.1 |
| 4,972,517 | 11/1990 | Kondou et al. | 307/270 |
| 4,996,453 | 2/1991 | Zanders et al. | 307/475 |
| 5,032,742 | 7/1991 | Zanders et al. | 307/296.5 |
| 5,047,663 | 9/1991 | Lee et al. | 307/296.1 |
| 5,051,626 | 9/1991 | Kajii | 307/475 |

FOREIGN PATENT DOCUMENTS

| | | |
|---|---|---|
| 62-287793 | 2/1987 | Japan . |
| 2-192397 | 7/1990 | Japan . |

*Primary Examiner*—Scott A. Rogers
*Assistant Examiner*—Madeleine Anh-Vinh
*Attorney, Agent, or Firm*—Fay, Sharpe, Beall, Fagan, Minnich & McKee

[57] ABSTRACT

A communication line driver for a communication interface includes on one chip, a trimming circuit for adjusting a reference voltage generated by a reference voltage generating circuit, a driving device for transmitting a signal to a communication line; a buffer for applying a constant voltage to the driving device by a constant voltage control based on an output of the trimming circuit, and a bias circuit for deciding an internal operating current of the buffer on the basis of the output of the trimming circuit. The buffer further includes an MOS transistor which operates as a current limiter and functions to limit the current in case of an overload. Thus, a resistor for the current control is unnecessary. An electric power consumption can be reduced by the current limitation at the time of overload.

9 Claims, 17 Drawing Sheets

RECEIVER 21

COMMUNICATION LINE DRIVER, LSI FOR INTERFACE INCLUDING SUCH A CIRCUIT AND COMMUNICATION TERMINAL APPARATUS

BACKGROUND OF THE INVENTION

The present invention relates to a communication line driver and, more particularly, to a technique which is useful when it is applied to, for example, an LSI for interface and a communication terminal apparatus in an integrated service digital network (ISDN).

The ISDN makes it possible to perform a high-speed digital transmission in which a traffic rate is equal to 144 kbps comprising two channels of a B (data) channel of 64 kbps and a D (control) channel of 16 kbps by using a subscriber's line which has conventionally been used for an analog audio signal transmission and is also called a telephone line. In such an ISDN, the subscriber's line is terminated in a digital service unit and is connected to an S/T point as a user network interface.

FIG. 4 shows a conventional S/T point driver. In such a driver, a transformer in which a turns ratio is equal to 2.2:1 is applied. One end of the transformer is connected to a center voltage point as a voltage division using resistors R1 and R2 and the other point is connected to a switch of a bipolar transistor. By an input of a digital signal, a pnp bipolar transistor Q2 or an npn bipolar transistor Q4 is turned on. When the pnp bipolar transistor Q2 is turned on, a high voltage side power source of 5 V is applied to the transformer. When the npn bipolar transistor Q4 is turned on, one end of the transformer is connected to a grand GND. By such a method, pulses of both positive and negative polarities are output by changing the direction of a current which flows in the transformer. Resistors R3 and R4 are connected to emitter electrodes of the transistors Q2 and Q4, respectively, and the connecting point is connected to base electrodes of bipolar transistors Q1 and Q3 of the same polarity, respectively. Collector electrodes of the transistors Q1 and Q3 are connected to base electrodes of the bipolar transistors Q2 and Q4, respectively. When an output current becomes too large, a voltage drop of the resistor R1 or R2 increases. Due to this, a base voltage of the bipolar transistor Q1 or Q3 increases, so that an on resistance of the bipolar transistor Q1 or Q3 decreases and the voltage applied to the base of the bipolar transistor decreases. Consequently, the circuit is controlled so that the output current decreases and functions as a current limiting circuit.

FIG. 5 shows another conventional example of an S/T point driver.

A pulse ('0' signal) of both polarities is transmitted by changing the direction of the current which flows in a transformer connected to terminals 01 and 02 in dependence on whether MOS transistors T1 and T4 are turned on or MOS transistors T2 and T3 are turned on by a bridge circuit of the MOS transistors T1 to T4. The above operation is equivalent to the operation of an equivalent circuit shown in FIG. 6A. The '1' signal is transmitted in a state in which all of the MOS transistors T1 to T4 are turned off. Source electrodes of the MOS transistors T2 and T4 are commonly connected at a terminal 04 and are connected to the ground GND by an externally attached resistor Rm. Gate electrodes of the MOS transistors T2 and T4 are connected to an output terminal of a differential amplifier OA. The source electrodes of the MOS transistors T2 and T4 are connected to an inverting input terminal (−) of the differential amplifier OA. A reference voltage Vref is applied to a non-inverting input terminal (+). When the MOS transistor T2 or T4 is turned on, a voltage/current converting circuit of (OA, T2, and Rm) or (OA, T4, and Rm) is formed. The potential of the terminal 04 is equal to the reference voltage Vref by the voltage follower operation of the differential amplifier OA. The current flowing in the resistor Rm is a constant current of IR=Vref/Rm. There is a specification of (CCITT recommendation I.430 corresponding to three kinds of load conditions (50 Ω, 400 Ω, 5.6 Ω) as for a pulse amplitude at the S/T point. In this method, as shown in FIG. 6B, the characteristics of the output to the load resistor in case of using the transformer of the turn ratio of 2:1 are shown in FIG. 7. A potential difference Vd1 between the terminals 03 and 04 is equal to 2.4 V and is constant for the load resistance. A potential difference Vd2 on the secondary side of the transformer is equal to 1.2 V and is constant to the load resistance. In order to satisfy the specification of the pulse mask, it is necessary to set a resistor RI which is externally attached to 30 Ω and a resistor RI' in FIG. 6B to 60 Ω. An output impedance of the driver is equal to 30 Ω and satisfies the specification of 20 Ω or more. When a load resistor RL is set to 5.6 Ω and 50 Ω, it is controlled by a constant current (IR=16.5 mA) and an output voltage is equal to Vout=IR× RL. When the load resistance is equal to 5.6 Ω, the output voltage is equal to 84 mV, which is lower than the specification value of 150 mV or less. When the load resistance is equal to 50 Ω, the output voltage is equal to 0.75 V, which lies within a specification range of 0.65 to 0.85 V. Both of those voltage values satisfy the characteristics of the specification. When the load resistance is equal to 400 Ω, the voltage limit is performed and Vout=Vd2×RL/(RI+RL). The output voltage is equal to 1.135 V, which lies within a specification range of 0.65 to 1.20 V, so that the output voltage satisfies the characteristics of the specification.

As an example of literatures disclosed with respect to the S/T point driver of the ISDN, there are papers of The Institute of Electronics and Communication Engineers of Japan of NTT (No. 10, Vol. J72-B-I, October, 1989) and JP-A-62-287793 shown in FIG. 5 of the prior art.

In the conventional circuit shown in FIG. 4, since the center point potential is supplied by voltage division using the resistors R1 and R2, the current stationarily flows into the resistors R1 and R2, so that the power consumption increases.

An output impedance of the driver is determined by resistors R3 and R4 connected to the emitters of the bipolar transistors Q2 and Q4. A variation in those resistors results in a variation of the output impedance when it is seen from the line side. In order to satisfy the specification of the output impedance in the ISDN (20 Ω or more when the '0' signal is transmitted), since it is necessary to adjust the value, it is difficult to provide such resistors R3 and R4 in the LSI. Therefore, it is difficult to make an LSI of the driver.

According to the conventional technique shown in FIG. 5, the resistor Rm having a small temperature dependency is needed to make the current constant. For this purpose, it is necessary to externally attach the resistor Rm. When the transformer of the turns ratio of 2:1 is used, resistors R10 and R20 are set to 60 Ω (total 30 Ω as a value in secondary side calculation), and as shown in FIG. 7, an electric power loss by the resistors R10 and R20 at the time of the constant current control when the load resistor is set to 5.6 Ω and 50 Ω is relatively large. It causes an increase in electric power consumption of the interface LSI having such a driver.

SUMMARY OF THE INVENTION

It is an object of the invention to provide a communication line driver which intends to a reduction of the number of externally attached components in an LSI form.

Another object of the invention is to provide a communication line driver which can reduce power consumption of an interface circuit including a communication line driver and which can easily form a one-chip LSI.

A communication line driver according to one feature of the invention comprises: a trimming circuit for adjusting a reference voltage generated by a reference voltage generating circuit; a driving device for driving a communication line to transmit a signal to the communication line; an internal power source buffer for applying a constant voltage to the driving device by a constant voltage control based on an output of the trimming circuit; a bias circuit for deciding an internal operating power source current of the internal power source buffer on the basis of the output of the trimming circuit; and a current limiter to limit the current which is supplied from the internal power source buffer to the driving device in an overload state in the communication line drive. In this instance, the reference voltage generating circuit obtains the reference voltage by extracting a difference between a threshold value of a depletion type field effect transistor whose threshold value has been lowered by an ion implantation and a threshold value of a field effect transistor which is coupled so that a current that is equal to the current flowing to the depletion type field effect transistor flows by a current mirror circuit. The trimming circuit can include feedback control means such as a fuse circuit for holding information to adjust an amplification factor of an operational amplifying circuit by controlling a negative feedback amount of the operational amplifying circuit for amplifying the output voltage of the reference voltage generating circuit. The internal power source buffer includes a source follower of the field effect transistor provided as an output stage of the current which is supplied to the driving device and a field effect transistor which is connected to a drain electrode side of the above field effect transistor and forms the current limiter by limiting the current flowing to the field effect transistor. In order to stabilize the bias circuit, the input reference voltage to the bias circuit can be adjusted so that a negative temperature coefficient of the current amplification factor of the field effect transistor which constructs the bias circuit is set off by a positive temperature coefficient as a square of a difference between the voltage between a gate and a source of the field effect transistor and the threshold value. In order to prevent a ringing in the case where an output terminal of the driving device is coupled to the communication line through a transformer, it is possible to provide a field effect transistor for short-circuiting an input terminal of the transformer at a timing such that the output terminal of the driving device is set into a high impedance state. The communication line driver constructed as mentioned above can be applied to drive the subscriber's side of the communication line in the integrated service digital network. Further, such a communication line driving circuit can be constructed as one LSI (namely, on one chip) and can be installed on the communication terminal apparatus.

In the circuit having the feature of the invention as mentioned above, the current limiter to execute a current limitation in an overload state of the communication line is provided in the internal power source buffer as a power source of the driving device, thereby making an externally attached resistor to obtain a constant current unnecessary so that the number of components which are attached externally can be reduced. The operating current of the analog circuit is determined by the bias circuit, the fluctuation of the power consumption of the analog, circuit portion is suppressed and the characteristics are stabilized, thereby making an surplus margin design unnecessary, so that the power consumption of the communication line driving circuit can be reduced. An LSI for interface of a small electric power consumption, and further, a communication terminal apparatus can be realized by including the communication line driving circuit.

The above and other objects and novel features of the invention will be apparent from the description of the specification in conjunction with the accompanying drawings.

DESCRIPTION OF THE PREFERRED EMBODIMENTS

Embodiments of the invention will now be described hereinbelow with reference to the drawings.

Figure 2:
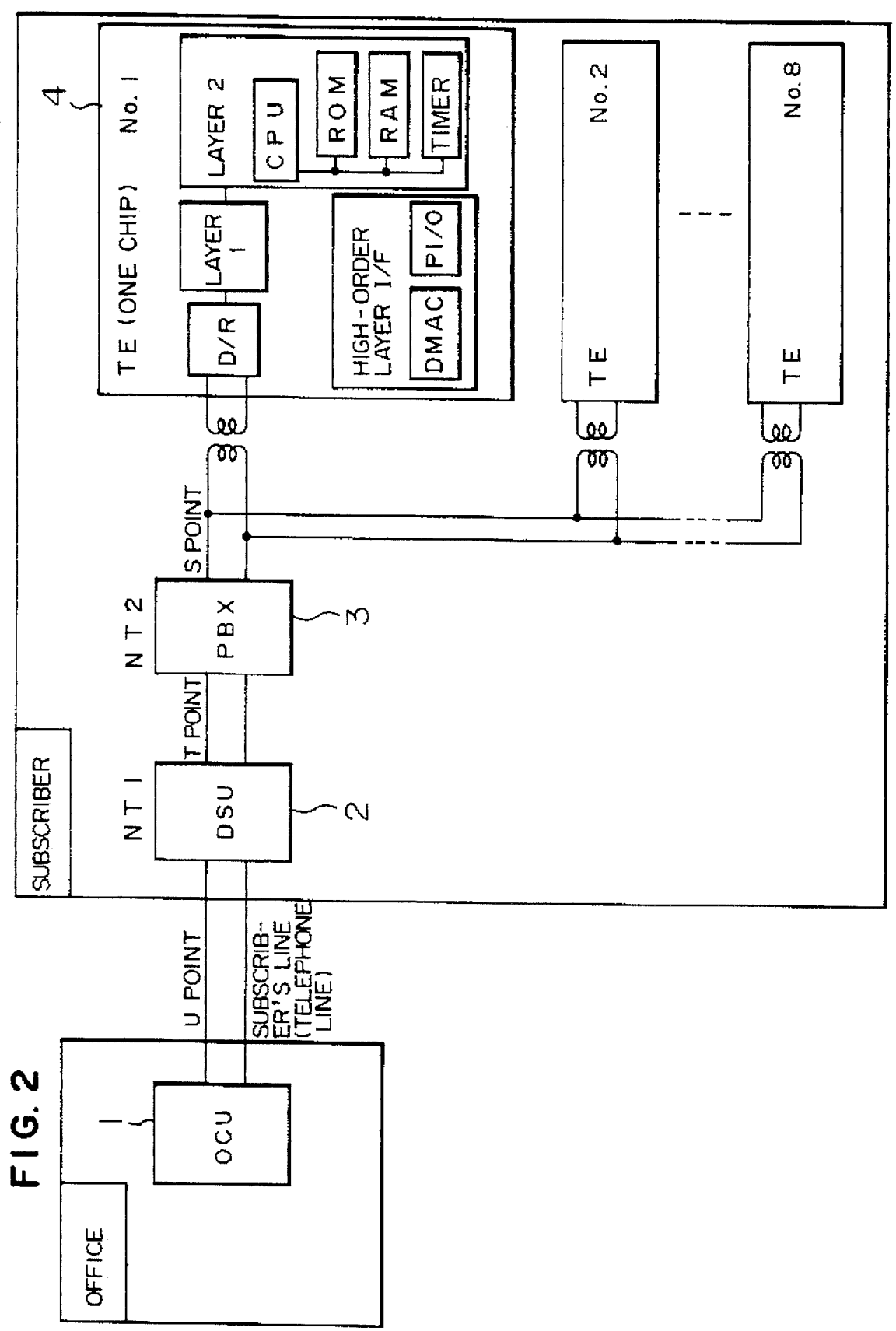
FIG. 2 is a constructional block diagram of a system of the ISDN to which the LSI for interface is applied.

FIG. 2 shows a system construction of the ISDN to which an LSI for interface at the S/T point according to an embodiment of the invention.

The ISDN makes it possible to perform a high speed digital transmission of 144 kbps (two channels of a B channel of 64 kbps and a D channel of 16 kbps) by using a subscriber's line (which has conventionally been used for a transmission of an analog audio signal and is also called a telephone line) as mentioned above. The subscriber's line connected to an intra-office network terminating device (OCU) 1 in a telephone office is set to a U point. Data is transferred at a rate of 160 kbps while including a maintenance bit at the U point. The subscriber's line (telephone line) is terminated at a DSU (digital service unit) 2 and is connected to the S/T point as a user's network interface. The T point relates to an interface between the DSU 2 and a PBX (private branch exchange) 3. The S point relates to an interface between the PBX 3 and an ISDN terminal 4. The S and T points have the same interface specification and the transfer rate is equal to 192 bps. Particularly, at the S point, up to eight ISDN terminals 4 can be connected. The LSI for S/T point interface executes a protocol control with respect to the data transfer and comprises a layer 1 control which is close to a physical layer and includes a driver/receiver to transmit and receive a pulse signal, a layer 2 to execute a protocol control such as an HDLC (High Level Data Link Control) or the like, an interface with a microcomputer which deals with various kinds of controls and further upper-order protocol and the like. A CPU (central processing unit), an ROM (read only memory), an RAM (random access memory), a timer, and the like are used in a part of the layers 1 and 2 and are operated by a microcomputer control according to a built-in firmware.

Figure 3:
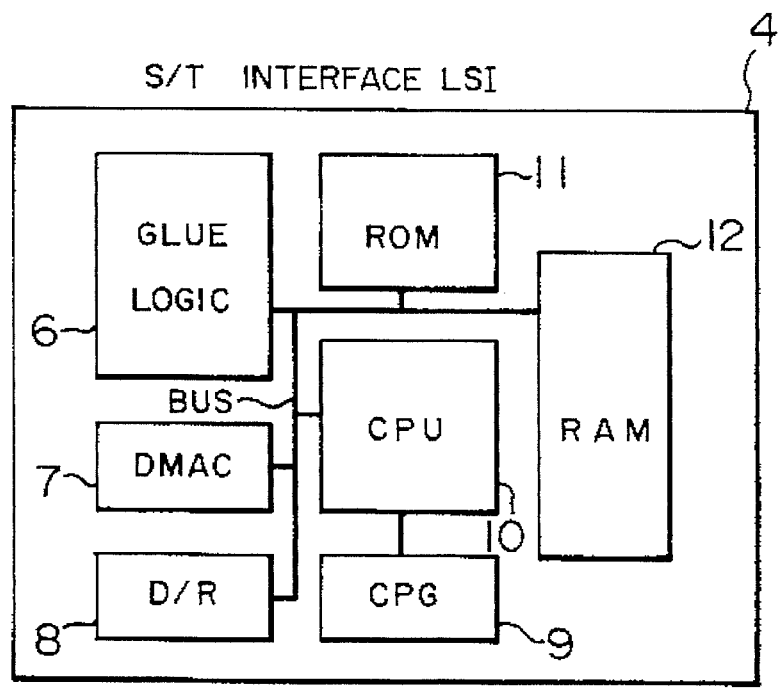
FIG. 3 is a constructional block diagram of the LSI for interface.

FIG. 3 shows a block construction of the LSI for S/T point interface.

Although not particularly limited, the LSI 4 for interface is formed on one semiconductor substrate such as monocrystal line silicon by a well-known manufacturing technique of a semiconductor integrated circuit. A CPG (clock pulse generator) 9, a CPU 10, an ROM 11, an RAM 12, a glue logic 6 to express a peripheral logic, a DMAC (direct memory access controller) 7, a driver/receiver (D/R) circuit 8, and the like are connected to a common internal bus BUS of the LSI 4 for S/T point interface. The CPG 9 formes an operating clock of the LSI 4 for S/T point interface. The CPU 10, RAM 12, and ROM 11 are used mainly for a protocol control of the layer 2. The glue logic 6 is formed as a hard module of a random logic to execute a control of the layer 1 such as an ID competition control or the like. The DMCA 7 is used when a packet transmission using the D channel is executed or the like and executes a data transfer control to store a predetermined field of the reception data or a reception frame which was processed in the line control into the RAM 12. The DMAC 7 also executes a transfer control to transmit the data stored in the RAM 12.

Figure 1:
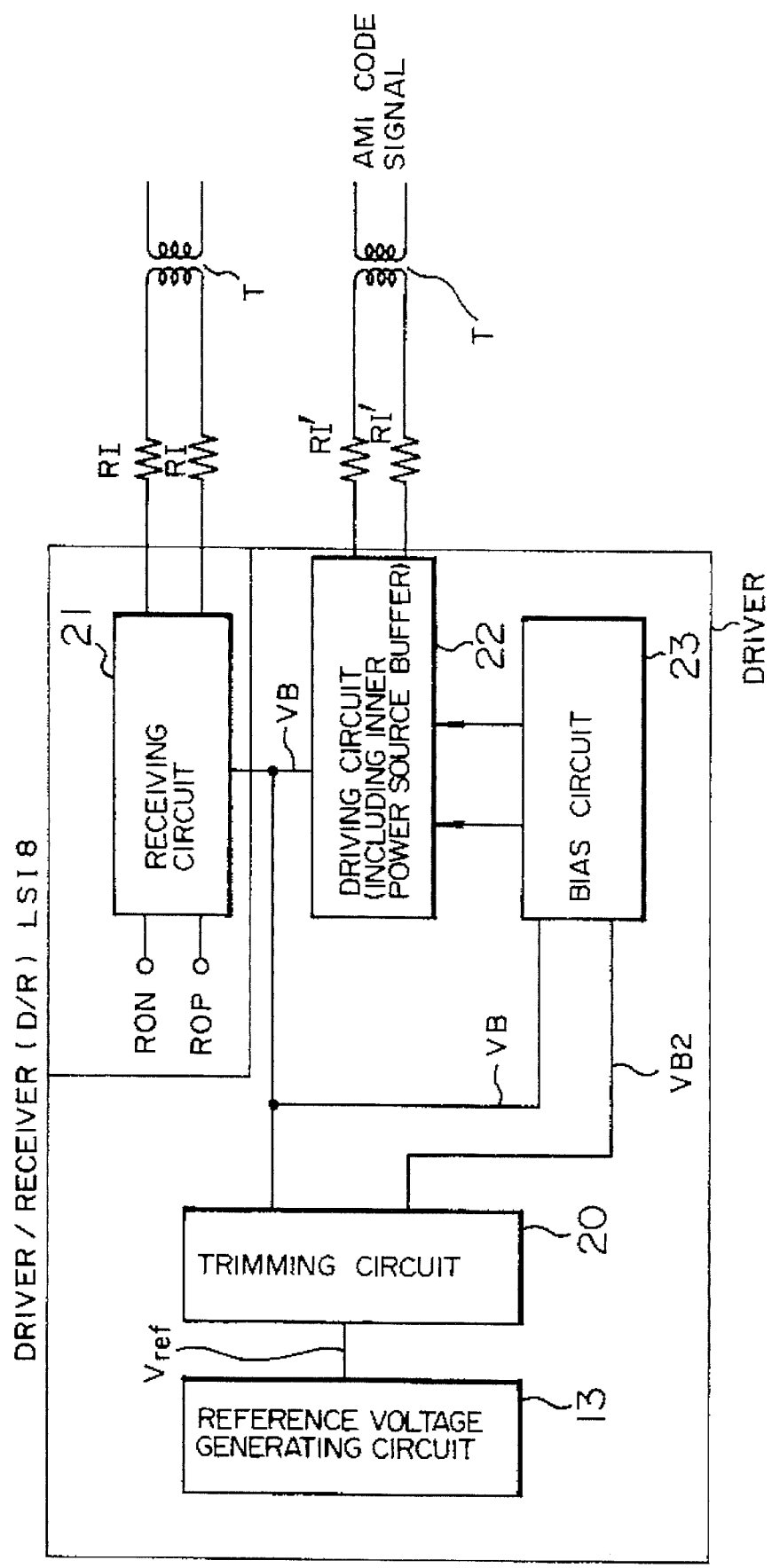
FIG. 1 is a constructional block diagram of a driver/receiver (D/R) circuit in an LSI for interface according to an embodiment of the invention.

FIG. 1 shows a constructional example of the D/R circuit 8 showing the embodiment of the invention.

Although not particularly limited, as shown in FIG. 1, the D/R circuit 8 includes: a reference voltage generating circuit 13 for generating the predetermined reference voltage Vref; a trimming circuit 20 including an operational amplifier, for producing an internal power source voltage VB by adjusting the reference voltage Vref generated from the reference voltage generating circuit 13 and for producing a reference voltage VB2 for a bias circuit 23; a receiving circuit 21 for reception; a driving circuit 22 for transmission; and the bias circuit 23 for producing a bias voltage of the driving circuit 22. The receiving circuit 21 is connected to a transformer T through the two resistors RI which are externally attached. The driver circuit 22 is connected to a transformer T' through the two resistors RI'.

The method of fetching the difference in a threshold value Vth between an n-channel type MOS transistor formed by an ion implantation and an ordinary n-channel type enhancement MOS transistor is applied to the reference voltage generating circuit 13 as will be described in detail hereinlater. Due to this, stable characteristics in which a fluctuation is small for variations in temperature, power source voltage, and processes are obtained. The trimming circuit 20 forms an internal power source voltage by changing the amplification factor of the operational amplifier. By trimming a resistance dividing potential of the internal power source voltage and giving to the bias circuit 23, a fluctuation of the bias current value due to variations in temperature, power source voltage, and processes is suppressed. The driving circuit 22 forms a power source voltage of the MOS transistor as a driving device by the internal power source buffer.

Figure 6A:
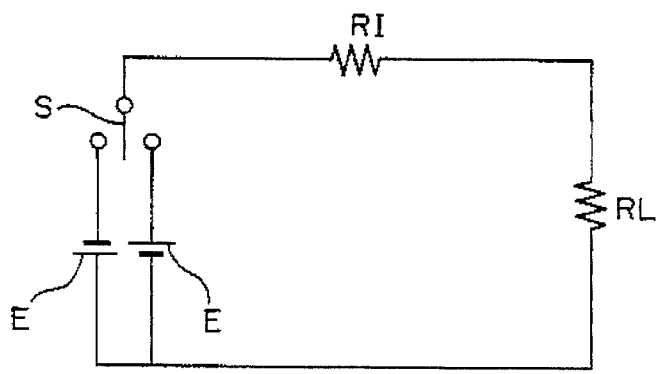
FIGS. 6A and 6B are equivalent circuit diagrams of the driving circuit, respectively.
Figure 6B:
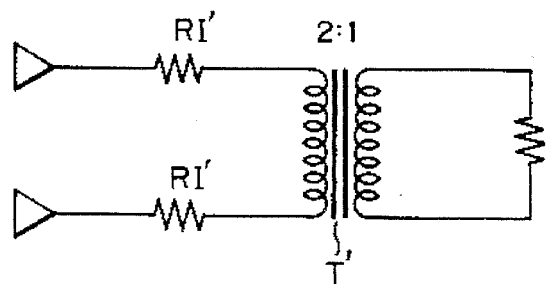
Figure 7:
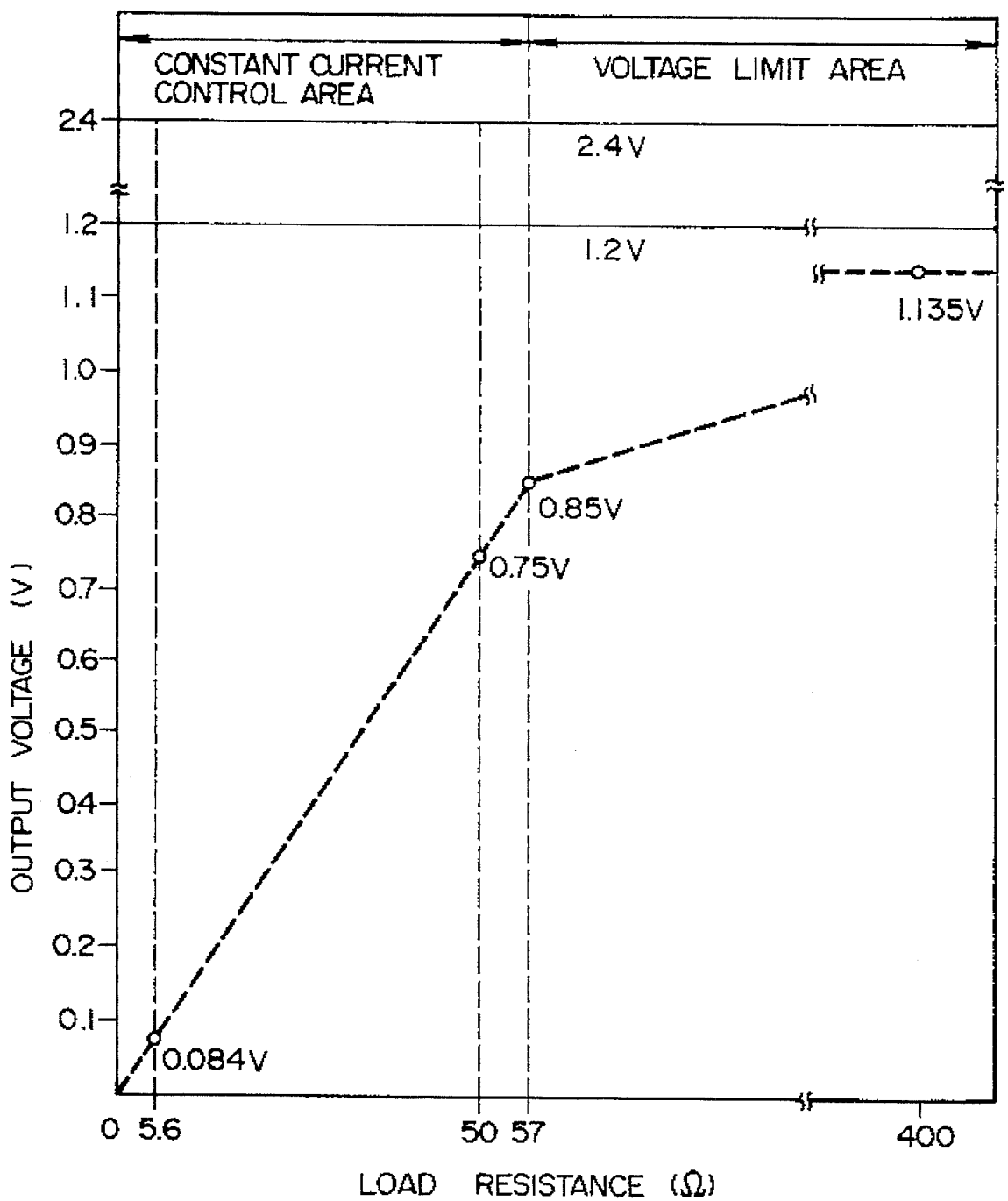
FIG. 7 is a characteristics diagram of the driving circuit in the conventional circuit.

As shown in FIG. 6B, the output terminal of the driving circuit 22 is connected to the transformer T' of the turn ratio of 2:1 through the two resistors RI' and the line at the S/T point is driven through the transformer T'. According to the driver specification of the ISDN of CCITT recommendation, the output impedance when the '0' signal is transmitted is set to 20 Ω or more. When the resistance component of the transformer T' is not considered, therefore, the resistor RI' in FIG. 6B is set to 40 Ω or more. In the embodiment, RI=23.3 Ω, the resistance component of the transformer T' (primary side 16 Ω, secondary side 8 Ω) and a leakage resistance are considered and the resistor RI' is set to 16 Ω. Upon transmission of the '0' signal, a switch S in FIG. 6A is connected to either one of the power sources E having both polarities and a pulse of both polarities is transmitted. Upon transmission of the '1' signal, the switch S in FIG. 6A is not connected to both of the power sources at the center point, no current flows into the transformer T' and a pulse at the zero level is outputted. According to the driver specification of the ISDN, the output impedance when the '1' signal is transmitted is equal to or larger than 20 kΩ, and the specification is satisfied by setting the driver output terminal into an open state.

Figure 8:
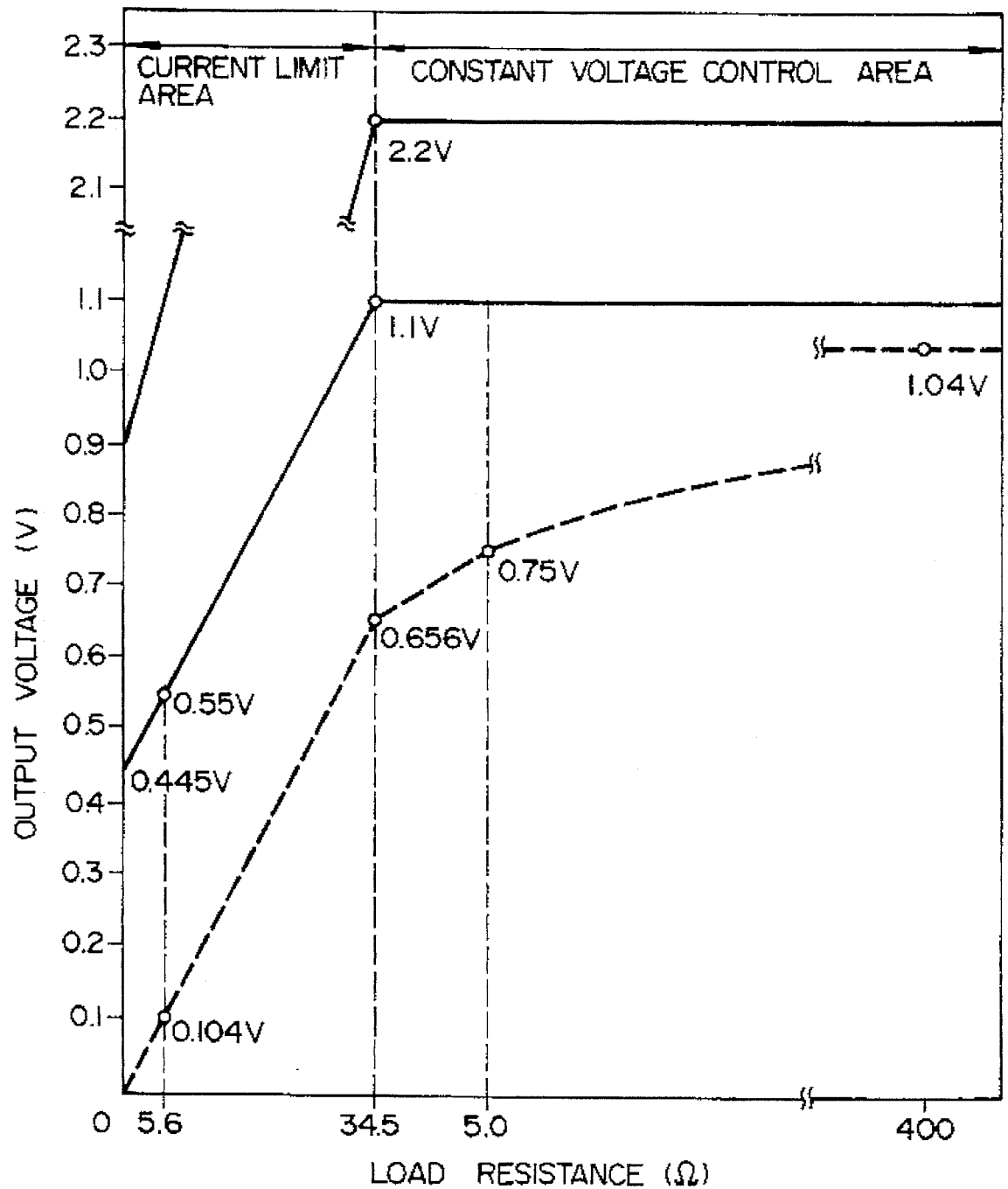
FIG. 8 is a characteristics diagram of the driving circuit in the embodiment.

FIG. 8 shows characteristics of a power source voltage and an output of the driving circuit 22 of the embodiment.

The internal power source of the driving circuit 22 is made operative by the constant voltage control when the load resistance is larger than 34.5 Ω while setting the load resistance of 34.5 Ω as a boundary and is made operative by the current limitation when the load resistance is smaller than 34.5 Ω. The internal power source voltage is constant in the constant voltage control region and equals to 2.2 V on the primary side and 1.1 V at the secondary side. In the current limit region, in the case where the load resistance is equal to or less than 34.4 Ω, the internal power source voltage is linearly reduced in association with the reduction of the load resistance. When the load resistance is equal to 5.6 Ω, the power source voltage is equal to 0.55 V. When the load resistance is equal to 0 Ω, the power source voltage is equal to 0.445 V. On the other hand, in the constant voltage control region, Vout=1.1×RL/(RI+RL). When the resistance value of RL is equal to 50 Ω, the power source voltage is equal to 0.75 V, which lies within a range of 0.675 to 0.825 V as a driver specification of the ISDN. When the RL is equal to 400 Ω, the power source voltage is equal to 1.04 V, which lies within a range of 0.675 to 1.20 V as a driver specification of the ISDN. Thus, both of the above voltages satisfy the specification. In the current limit operating region, the current limit value Im is equal to 19 mA and Vout=Im×RL. When RL=5.6 Ω, the power source voltage is equal to 104 mV, which is smaller than the driver specification of the ISDN of 150 mV or less, so that it satisfies the specification.

Figure 9:
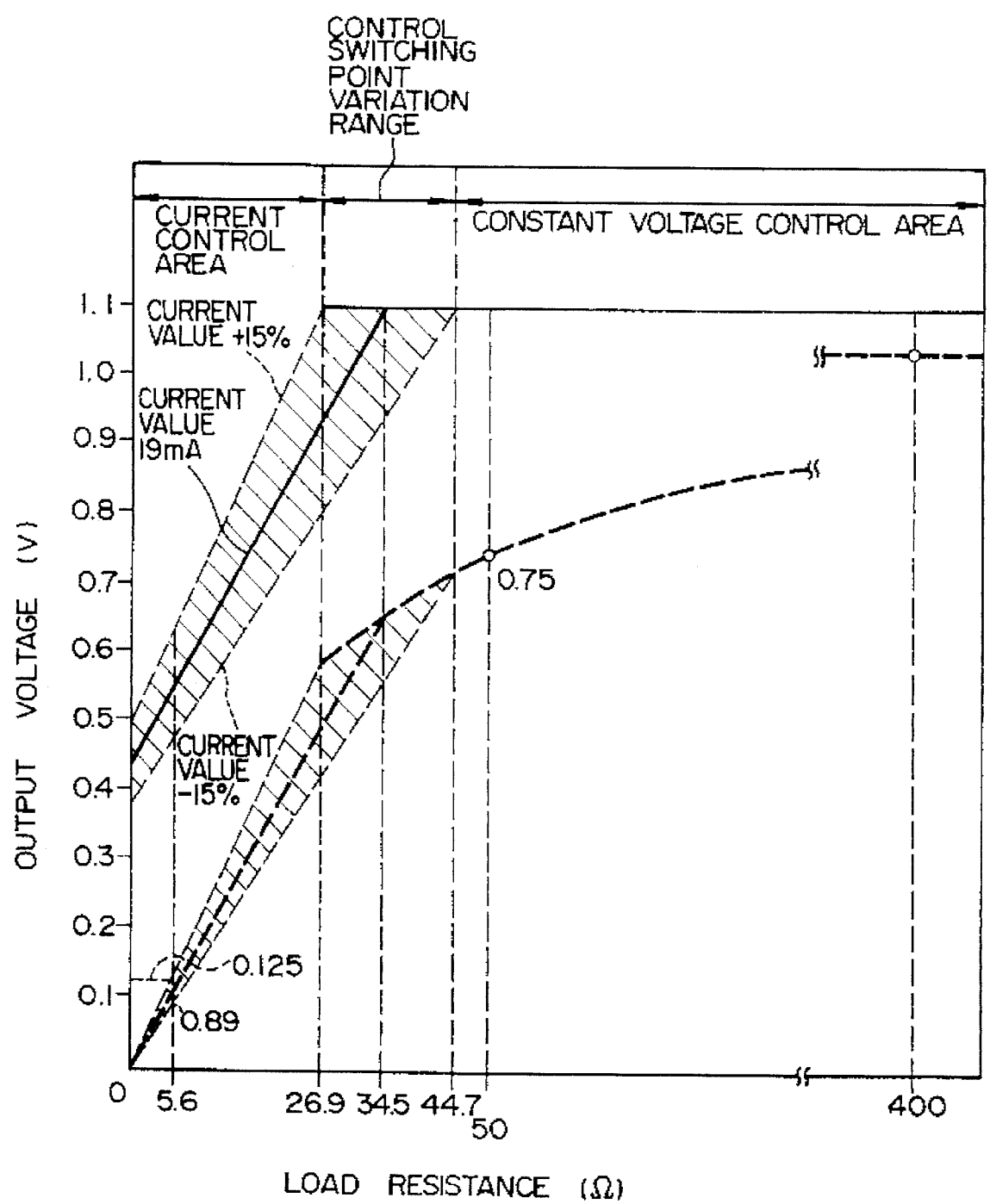
FIG. 9 is a characteristics diagram when it is assumed that a current of a bias circuit of the embodiment varies by ±15%.

In the embodiment, a current limit circuit according to a constant current sources is provided in the internal power source buffer in order to realize the internal power source characteristics in FIG. 8. Due to a variation of the current value of the constant current source, however, there is a danger such that the change point from the constant voltage control region to the current control region unevenly varies. According to the buffer specification of the ISDN, the output voltage is equal to 0.75 V when the buffer load resistance is equal to 50 Ω, therefore, it is necessary to set the constant current value to 15 mA or more. The output voltage is 0.15 V or less when the load resistance is equal to 5.6 Ω, it is necessary to set the constant current value to 26.8 mA or less. Since it is advantageous that the constant current value is as small as possible in the allowable range of the variation from a view point of a small electric power consumption, the constant current value is set to 19 mA in the embodiment. The current variation of the bias circuit which decides the constant current value is suppressed to ±5% or less by fuse trimming. FIG. 9 shows the internal power source and the variation of the output characteristics when it is assumed that the variation is about in ±15% consideration of the operational margin. Even when constant current value varies by ±15%, since the constant current value is equal to 16.15 to 21.85 mA, which lies within the above-mentioned range and the control change point is equal to 26.9 to 44.7 Ω, the desired characteristics are satisfied.

A further detailed construction of each section will now be described.

Figure 10:
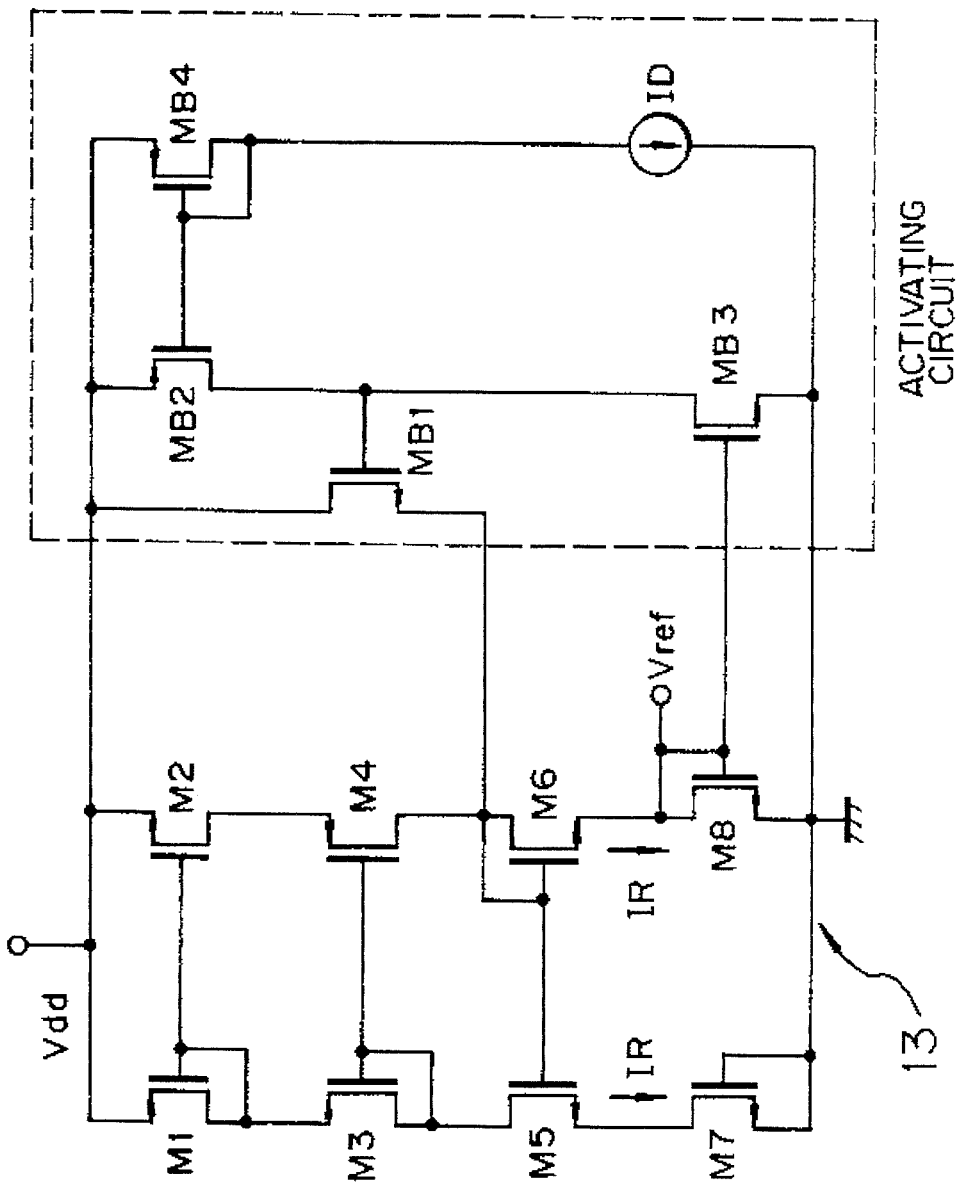
FIG. 10 is a circuit diagram showing a constructional example of a reference voltage generating circuit in the embodiment.

FIG. 10 shows a constructional example of the reference voltage generating circuit 13 of the D/R circuit as shown in FIG. 1.

A fundamental circuit section of the reference voltage generating circuit 13 is constructed by the MOS transistors M1–M8. The circuit which is constructed by MOS transistors MB1–MB4 and a current source ID is an activating circuit to activate by forcefully allowing the current to flow in the case where the generating operation of the reference voltage enters a unstable state and the current value is abnormally small. The MOS transistors M1–M4 are formed by ordinary p-channel MOS transistors and construct a current mirror circuit. The high potential side power source Vdd is applied to the p-channel MOS transistors M1 and M2. M5 and M6 denote ordinary n-channel MOS transistors and execute a DC feedback to equalize the VDS (voltages between the drain and the source) of the MOS transistors M7 and M8, thereby equalizing the operating state. M8 indicates the ordinary n-channel MOS transistor (enhancement type). M7 denotes the depletion type MOS transistor whose threshold value Vth was lowered by executing an implantation of As ions and in which a gate electrode is connected to the ground. A current IR of the reference voltage generating circuit 13 is determined by the MOS transistor M7. When it is now assumed that the current amplification factor of the MOS transistor M7 is set to $\beta_7$ and the threshold value Vth is set to Vtd, the current IR of the reference voltage generating circuit 13 is $$IR=0.5\times\beta_7\times(Vtd)^2$$

When it is assumed that the current mirror ratio is equal and the sizes of the MOS transistors M7 and M8 are the same and the current amplification factor $\beta_7$ of the MOS transistor M7 and a current amplification factor $\beta_8$ of the MOS transistor M8 are the same, the current IR also flows into the MOS transistor M8 and the output Vref of the MOS transistor M8 to which the gate electrode and the drain electrode are connected is $$Vref=(2\times IR/\beta_8)^{1/2}+Vte=Vte-Vtd$$

and a difference between the threshold value Vtd of the MOS transistor M7 and the threshold value Vte of the MOS transistor M8 is fetched as an output voltage Vref of the reference voltage generating circuit 13, that is, as a reference voltage. Since the difference between the threshold values of the MOS transistors M7 and M8 is decided by one implantation of As ions, the controllability is good. Since the n-channel type depletion MOS transistor (M7) by the As ions and the ordinary n-channel type enhancement MOS transistor (M8) are relatively similar with respect to the MOS characteristics, the temperature dependency is small and the stable reference voltage Vref can be obtained.

Figure 11:
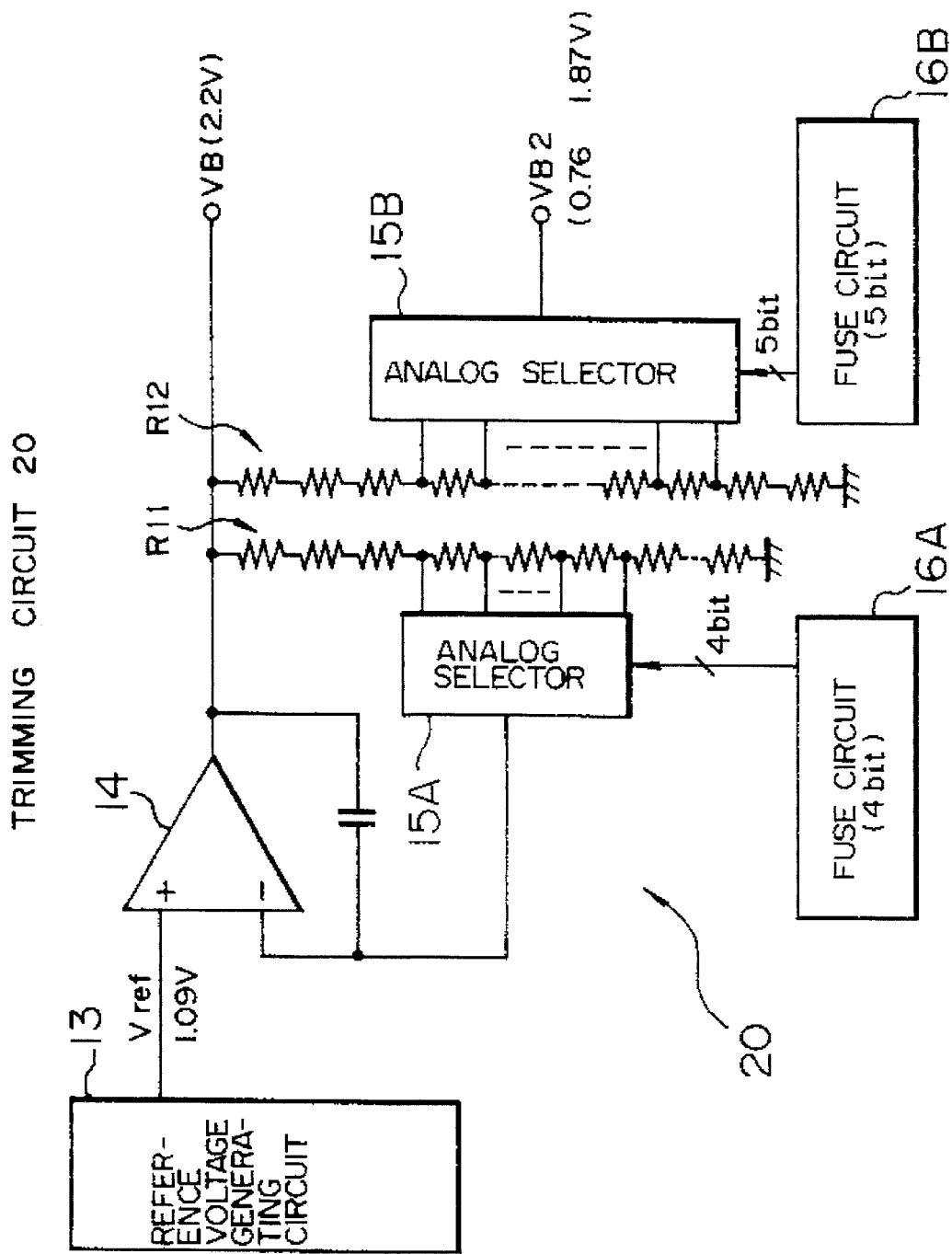
FIG. 11 is a circuit diagram showing a constructional example of a trimming circuit in the embodiment.

FIG. 11 shows a constructional example of the trimming circuit 20.

The trimming circuit 20 can trim the internal power source voltage VB (2.2 V) and the reference voltage VB2 for the bias circuit in the wafer probing. In the embodiment, although not particularly limited, it is assumed that the reference voltage generating circuit 13 generates a voltage of about 1.09 V. The output voltage Vref of the reference voltage generating circuit 13 is applied to the non-inverting input terminal (+) of an operational amplifying circuit (AMPD) 14. The output terminal of the operational amplifying circuit 14 is connected to resistor trains R11 and R12 of two systems. The other ends of the resistor trains R11 and R12 are connected to the ground GND. The center tap of the resistor train R11 is connected to the inverting input terminal of the operational amplifying circuit 14 through an analog selector 15A, thereby constructing a negative feedback path. The analog selector 15A is a tournament tree type construction of the analog switch and selects the center tap point of the resistor train R11 by the information of a current cutting type fuse circuit of 4 bits or an EPROM circuit 16A. By the selection of the tap, since the resistance value concerning the circuit is changed, the amplification factor of the operational amplifying circuit 14 is changed. The output voltage Vref of the reference voltage generating circuit 13 varies to a certain extent by the process. However, by changing the amplification factor of the operational amplifying circuit 14 by the shut-off of the current by the fuse or by the trimming due to the value designation and selection of the ROM as mentioned above, the reference voltage VB can be adjusted to the target value of 2.2 V.

An analog selector 15B similar to the above analog selector 15A is connected to a center tap of the other resistor train R12 connected to the output terminal of the operational amplifying circuit 14. By selecting the intermediate potential by the analog selector 15B, the reference voltage VB2 for the bias circuit is formed. An analog selector in which the number of selection taps is larger than that of the analog selector 15A is used as an analog selector 15B. Although not particularly limited, a 5-bit current cutting type fuse circuit or EPROM 16B is connected to the analog selector 15B. By the trimming of the fuse circuit 16B, the center tap point of the resistor train R12 can be selected. By applying the 5-bit current cutting type fuse circuit or EPROM 16B, the reference voltage VB2 can be adjusted in a wide range of 0.76 to 1.87 V.

Figure 12:
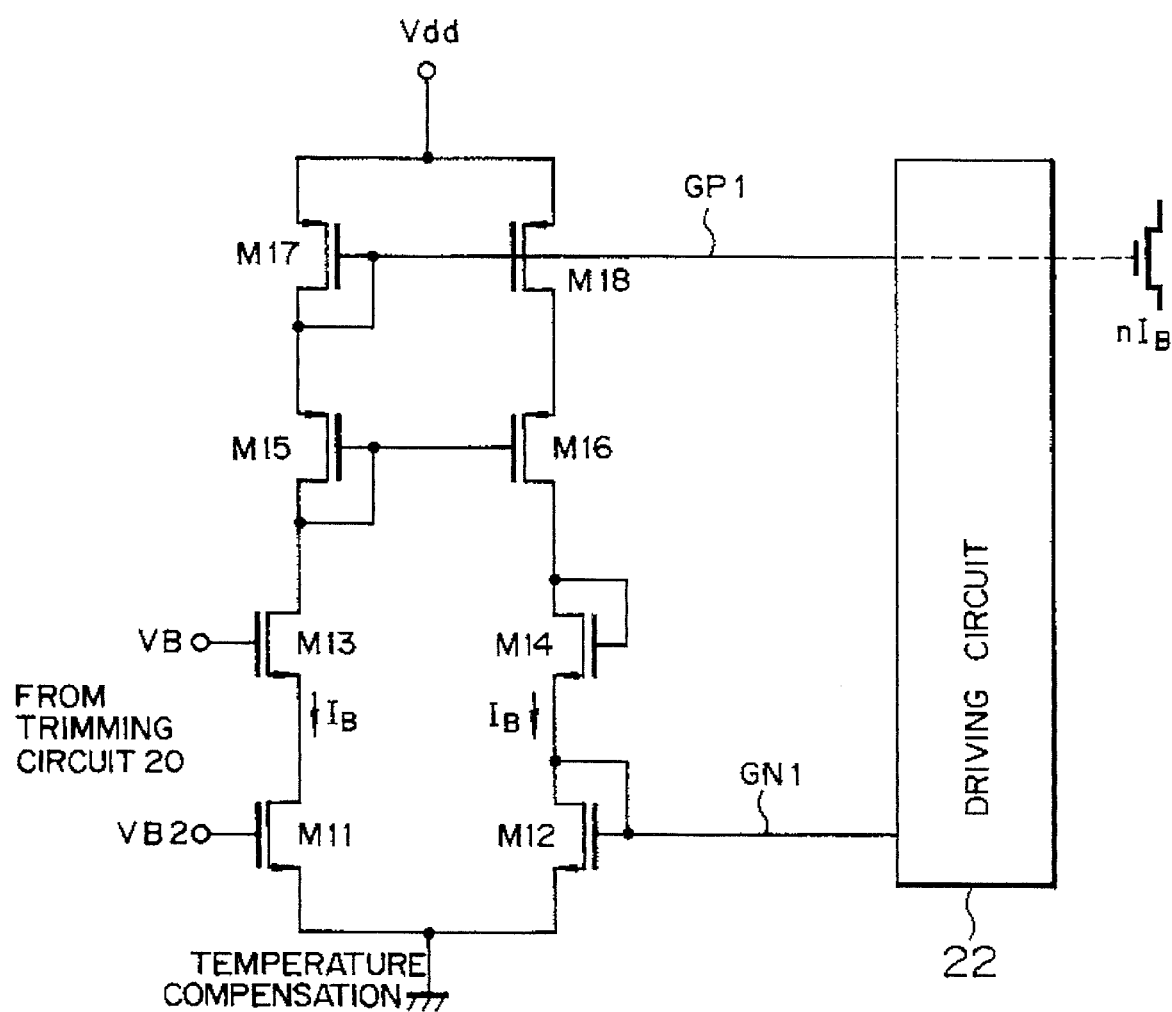
FIG. 12 is a circuit diagram showing a constructional example of a bias circuit in the embodiment.

FIG. 12 shows a constructional example of the bias circuit 23.

M15 to M18 denote ordinary p-channel type MOS transistors and construct a current mirror circuit. A high voltage side power source Vdd is applied to the p-channel type MOS transistors M17 and M18. The p-channel type MOS transistors M17 and M15 and the n-channel type MOS transistors M13 and M11 are serially connected. The p-channel type MOS transistors M18 and M16 and the n-channel type MOS transistors M14 and M12 are serially connected. The reference voltage VB (2.2 V) as an output of the trimming circuit 20 shown in FIG. 11 is applied to a gate electrode of the n-channel type MOS transistor M13. The reference voltage VB2 (0.76 to 1.87 V) as another output of the trimming circuit 20 is applied to a gate electrode of the n-channel type MOS transistor M11.

The current value IB of the bias circuit 23 is determined by the reference voltage VB2 which is given to the gate electrode of the n-channel type MOS transistor M11. Now, assuming that a current amplification factor of the transistor M11 is set to $\beta_{11}$, the current value IB is obtained by the following equation.

$$IB=0.5\times\beta_{11}\times(VB2-Vte)^2$$

Generally, the current amplification factor $\beta_{11}$ has a negative temperature coefficient of about $-1.5$ power for the temperature. Since the threshold value Vth has a negative temperature coefficient of about $-1.5$ mV/°C., $(VB2-Vte)^2$ has a positive temperature coefficient. By adjusting the reference voltage VB2 by the trimming according to the threshold voltage Vth of the n-channel type MOS transistor so as to set off the negative temperature coefficient of the current amplification factor $\beta_{11}$ and the positive temperature coefficient of $(VB2-Vte)^2$, the bias circuit 23 of a small temperature dependency can be realized. Since the reference voltage VB2 is formed by the trimming circuit 20 on the basis of the output voltage Vref of the reference voltage generating circuit 13 having small power source voltage (Vdd) dependency and temperature dependency, a stable bias voltage in which the bias current hardly depends on a power source voltage fluctuation, a temperature change, and a variation of processes can be eventually obtained. The output of the bias circuit 23 is derived from terminals GP1 and GN1 and supplied to the driving circuit 22.

Figure 13:
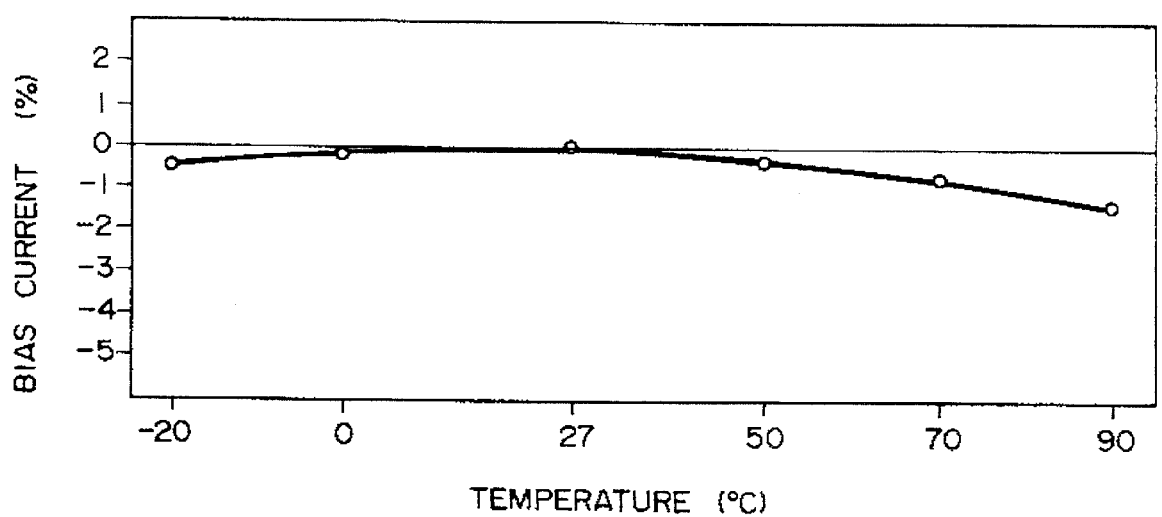
FIG. 13 is a characteristics diagram of a temperature dependency of a bias current in the bias circuit.

FIG. 13 shows the result of the experiments of the temperature dependency of the bias current in the bias circuit 23.

As shown in FIG. 13, according to the experiments of the temperature dependency, there is a bias current fluctuation within 2% in a temperature change of $-20°$ to $90°$ C. Even when many variations are considered, the current variation can be suppressed to a variation within $\pm 5\%$. As will be explained in detail hereinbelow, by controlling a constant current source in the operational amplifying circuit in the driving circuit 22 by using the bias circuit 23, good internal power source characteristics can be guaranteed. Although not shown, operating currents of all of the analog circuits in the LSI in the embodiment are determined by the bias circuit 23. A fluctuation of the power consumption of the analog section eventually decreases, the characteristics are stabilized, and a surplus margin design becomes unnecessary. Such a point is effective from a viewpoint of the realization of small power consumption of the LSI.

Figure 14:
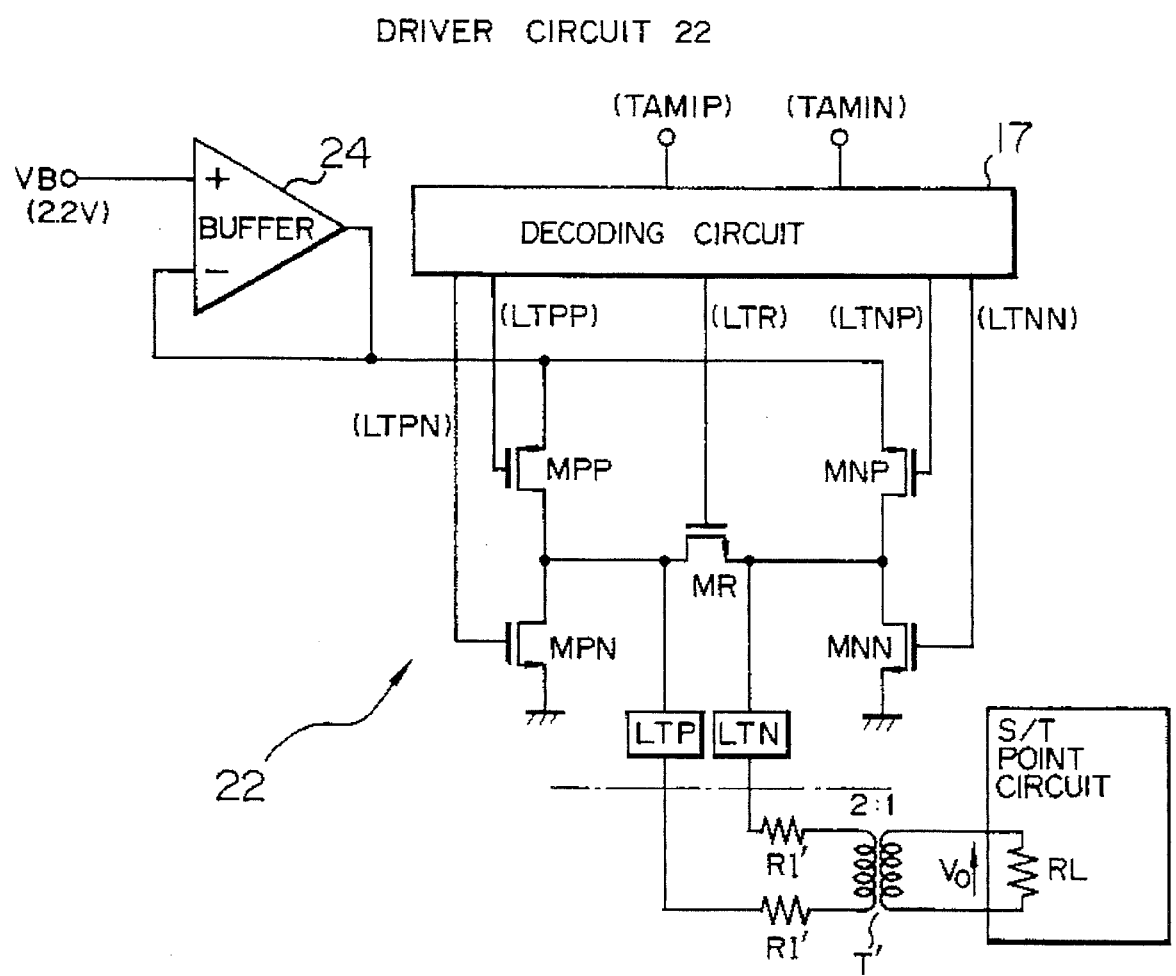
FIG. 14 is a circuit diagram showing a constructional example of the driving circuit in the embodiment.

FIG. 14 shows a constructional example of the driving circuit 22.

The reference voltage VB formed by the trimming circuit 20 is impedance converted by a voltage follower circuit of an operational amplifying circuit 24 of an internal power source buffer. After that, the reference voltage is applied to source electrodes of p-channel type MOS transistors MPP and MNP of the driving circuit. An output terminal LTP on the positive side is led out from the point at which drain electrode of the p-channel type MOS transistor MPP and a drain electrode of an n-channel type MOS transistor MPN are connected. A source electrode of the n-channel type MOS transistor MPN is connected to a ground GND. An output terminal LTN on the negative side is led out from the point at which a drain electrode of the p-channel type MOS transistor MNP and a drain electrode of an n-channel type MOS transistor MNN. A source electrode of the n-channel type MOS transistor MNN is connected to the ground GND. The MOS transistors MPP, MPN, MNP, and MNN are driving elements which use an output of the operational amplifying circuit 24 as a power source and are used to drive the communication line through the transformer T'. An n-channel type MOS transistor MR is connected between the output terminals LTP and LTN so as to bridge both of the terminals at the time of transition (at an instance of transiting from a state "0" to another state "1"). The transistor MR functions to prevent the ringing. Each of the above MOS transistors at the output stage is on/off controlled by control signals LTPN, LTPP, LTR, LTNP, and LTNN which are formed by a decoding circuit 17 to decode transmission digital signals TAMIP and TAMIN of two bits. The output terminals LTP and LTN are coupled to the transformer T' of a turn ratio of 2:1 through the resistors RI'.

Figure 15:
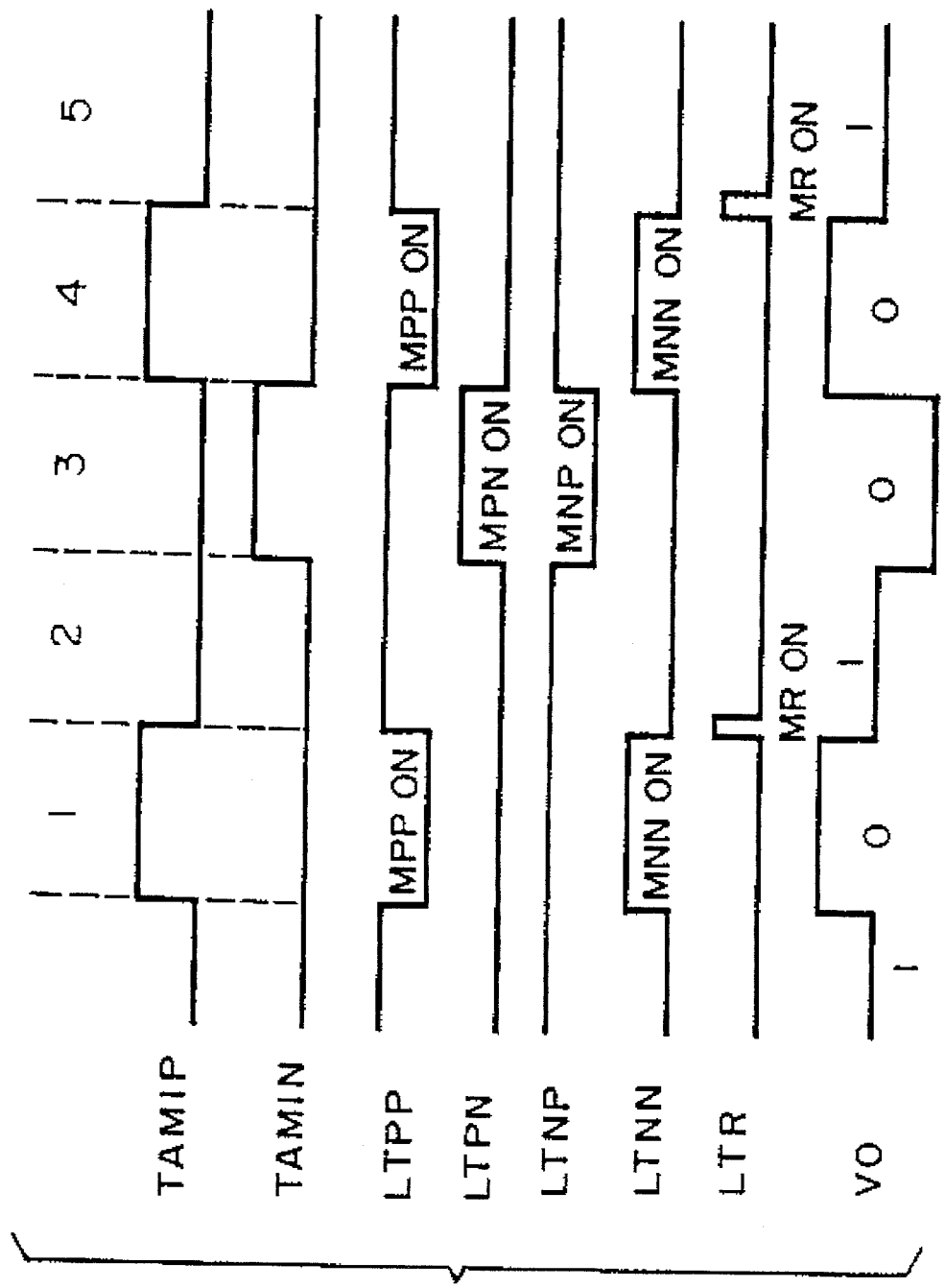
FIG. 15 is an operation timing diagram of the driving circuit.

The operation of the driving circuit 22 will now be described with reference to a time chart of FIG. 15.

An AMI (Alternated Mark Inversion) code is a code such that when the AMI code is equal to "1", a signal is set to the zero level and, when it is equal to "0", a positive pulse and a negative pulse are alternately output and a DC offset is set to zero. The transmission digital signals TAMIP/TAMIN are signals such that when those signals are equal to 1/0, they correspond to the positive pulse, when they are equal to 0/1, they correspond to the negative pulse, and when they are equal to 0/0, they correspond to zero.

When the transmission digital signal TAMIP/TAMIN are equal to 1/0, the control signal LTPP is set to the low level, the control signal LTPN is set to the low level, the control signal LTNP is set to the high level, the control signal LTNN is set to the high level, and only the MOS transistors MPP and MNN are turned on. Since the current consequently flows in the direction from the output terminal LTP to the output terminal LTN, a secondary voltage Vo of the transformer T' is set to a positive pulse.

When the transmission digital signal TAMIP/TAMIN are equal to 0/0, the control signal LTPP is set to the high level, the control signal LTPN is set to the low level, the control signal LTNP is set to the high level, the control signal LTNN is set to the low level, and all of the MOS transistors are turned off. In this instance, no current flows to the output terminals LTP and LTN and a pulse at the zero level is output through the transformer T'.

When the transmission digital signals TAMIP/TAMIN are equal to 0/1, the control signal LTPP is set to the high level, the control signal LTPN is set to the high level, the control signal LTNP is set to the low level, the control signal LTNN is set to the low level, and only the MOS transistors MPN and MNP are turned on. In this instance, since the current flows in the direction from the output terminal LTN to the output terminal LTP, a negative pulse is output through the transformer T'.

When the transmission digital signals TAMIP/TAMIN are equal to 1/0 or when a transition from 0/1 to 0/0 of those signals occurs, the control signal LTR is set to the high level for only a short time, so that the MOS transistor MR is turned on. It is an object of the above construction to suppress the ringing such that a resonant phenomenon due to a counter electromotive force when the current flowing in the transformer T' is shut off is considered as a cause. In the embodiment, when the transmission digital signals TAMIP/TAMIN are equal to 1/0 or when a transition from 0/1 to 0/0 of them occurs, the MOS transistor MR is instantaneously short-circuited by the switching operation of the MOS transistor MR, such a ringing is suppressed, thereby satisfying a pulse mask in the ISDN.

Figure 16:
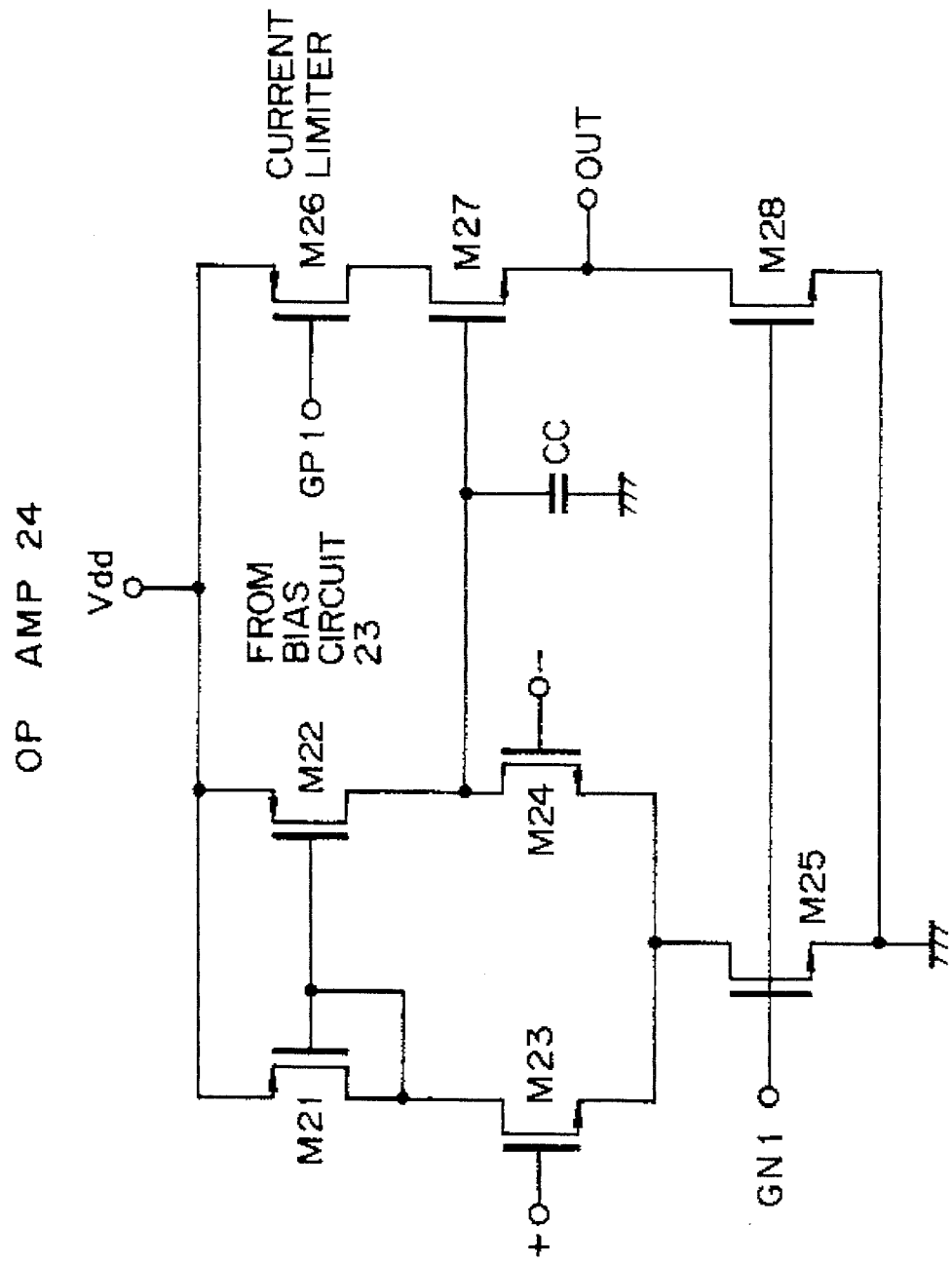
FIG. 16 is a circuit diagram showing a constructional example of an operational amplifying circuit which is included in the driving circuit.

FIG. 16 is shows a constructional example of the operational amplifying circuit 24 as an internal power source buffer shown in FIG. 14.

An output of a differential stage which is formed by p-channel type MOS transistors M21 and M22 and an n-channel type MOS transistors M23, M24, and M25 is received by a source follower circuit of n-channel type MOS transistors M27 and M28, thereby obtaining a buffer output OUT from the source follower circuit. The output of the differential stage is transferred to a gate electrode of the n-channel type MOS transistor M27. A capacitor CC, however, to limit a frequency band is added to the above transfer path, thereby stabilizing the circuit operation. An output voltage from the terminal GN1 of the bias circuit 23 is applied to gate electrodes of the n-channel type MOS transistors M25 and M28, thereby forming a current source. An operating current of the operational amplifying circuit 24 is determined by such a current source. A p-channel type MOS transistor M26 is connected between the high voltage side power source Vdd and a drain electrode of the n-channel type MOS transistor M27. An output voltage from the terminal GP1 of the bias circuit 23 is applied to a gate electrode of the p-channel type MOS transistor M26, thereby forming a constant current source which functions as a current limiter. As shown in FIG. 8, when the load resistance is so small to be 5.6 Ω and becomes an overload, such a current limiter functions so as to limit an output current of the driving circuit. As mentioned above, since the circuit is controlled by the stable output of the bias circuit, the stabilities of the operating current and current limit value of the operational amplifying circuit 24 are high. Since the output stage of the operational amplifying circuit 24 is the source follower by the n-channel type MOS transistors M27 and M28, an output impedance is low, so that the circuit of the invention is suitable as a power source circuit of the MOS transistors MPP, MPN, MNP, and MNN which need a comparatively large current in order to drive the communication line.

Figure 17:
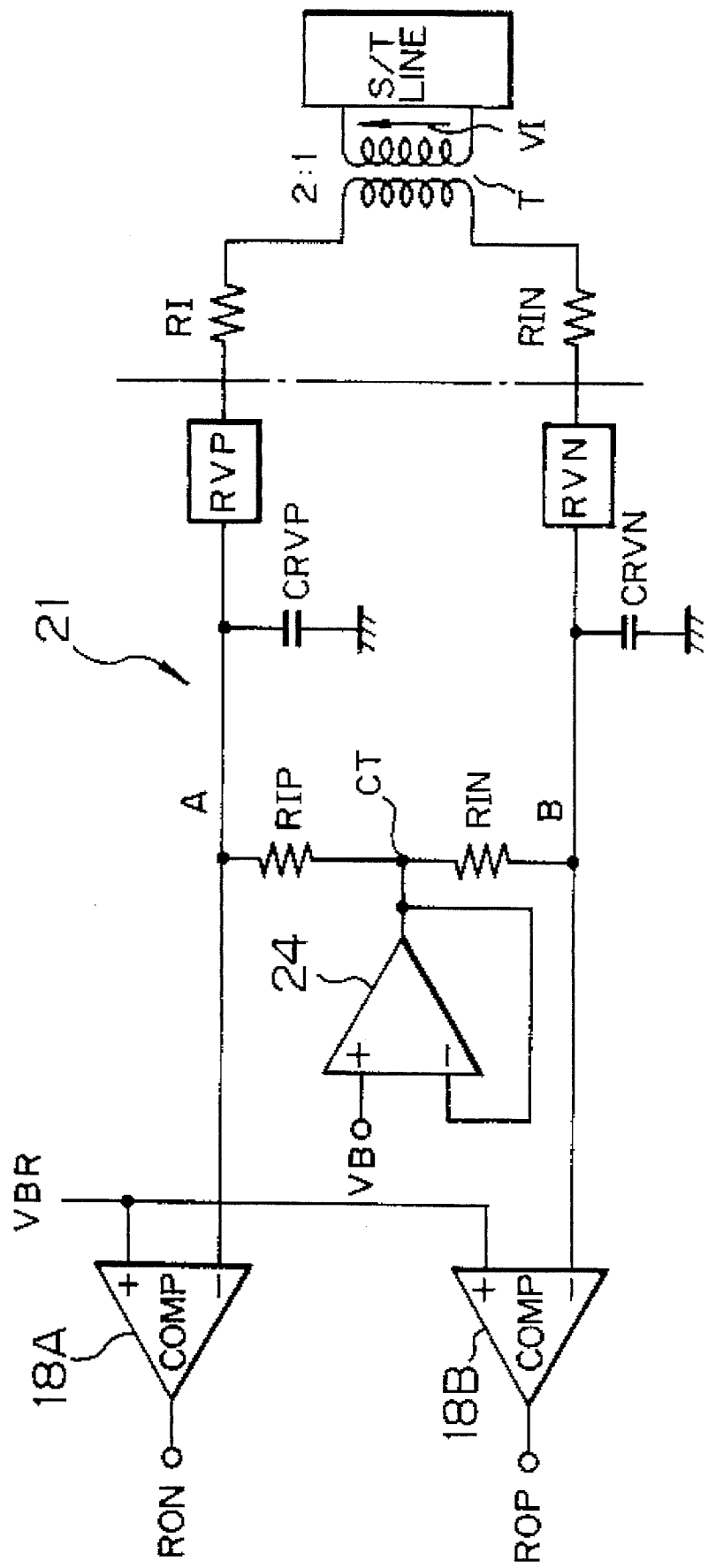
FIG. 17 is a circuit diagram showing a constructional example of a receiving circuit in the embodiment.

FIG. 17 shows a constructional example of the receiving circuit 21 of the LSI 4 for interface.

Capacitors CRVP and CRVN to eliminate a high frequency component are provided between the transfer path of the reception signal which is obtained through the transformer T and the ground. Resistors RIP and RIN are serially connected on such a transfer path. An output voltage (2.2 V) of a voltage follower by the operational amplifying circuit 24 is applied as a voltage at the serial connecting point CT of the resistors RIP and RIN. Thus, the voltage at the center point of points A and B is equal to 2.2 V of the internal power source, so that an analog reception signal becomes a differential signal in which 2.2 V is used as a center. Such a signal is input to comparators 18A and 18B at the post stage. Since the signal level is judged by the comparators 18A and 18B, it is converted into digital signals RON and ROP. These digital signals are transmitted to a circuit at the post stage (not shown) and processed.

Figure 18:
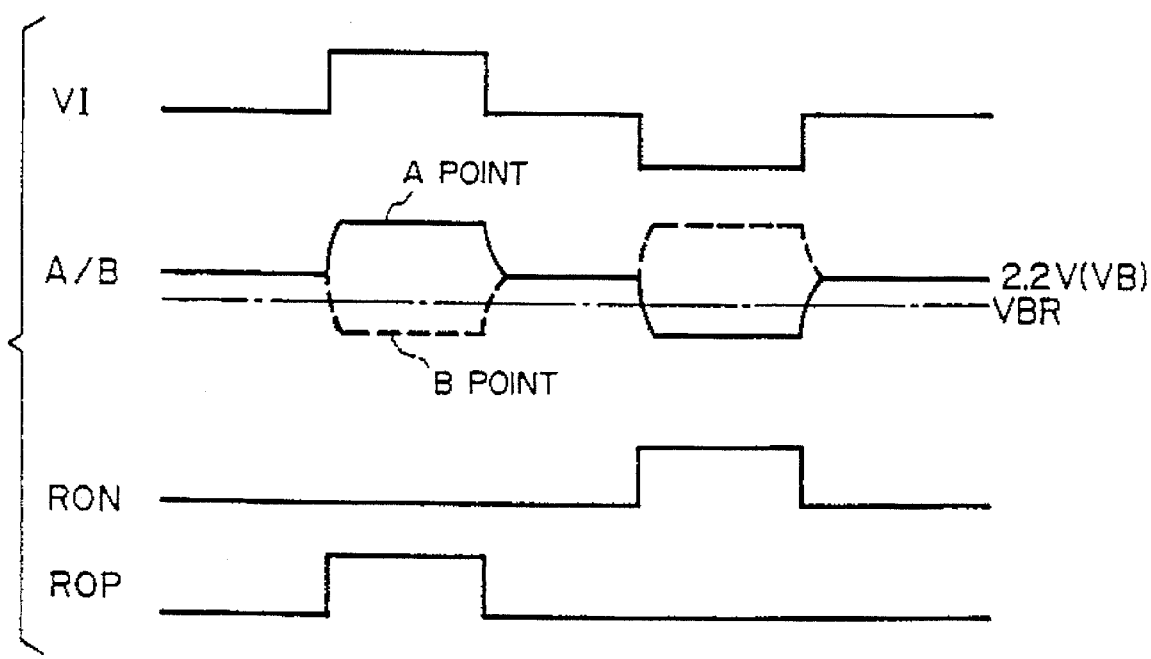
FIG. 18 is an operation timing diagram of the receiving circuit.

FIG. 18 shows an operating timing of the receiving circuit 21.

The analog reception signal is changed to the differential signal and judged by the comparators 18A and 18B and, after that, the digital signals RON and ROP are output. The stabilized output voltage VB of the operational amplifying circuit 24 is supplied to not only the driving circuit 22 but also the receiving circuit 21, thereby suppressing a fluctuation in electric power consumption of the analog section.

Figure 19:
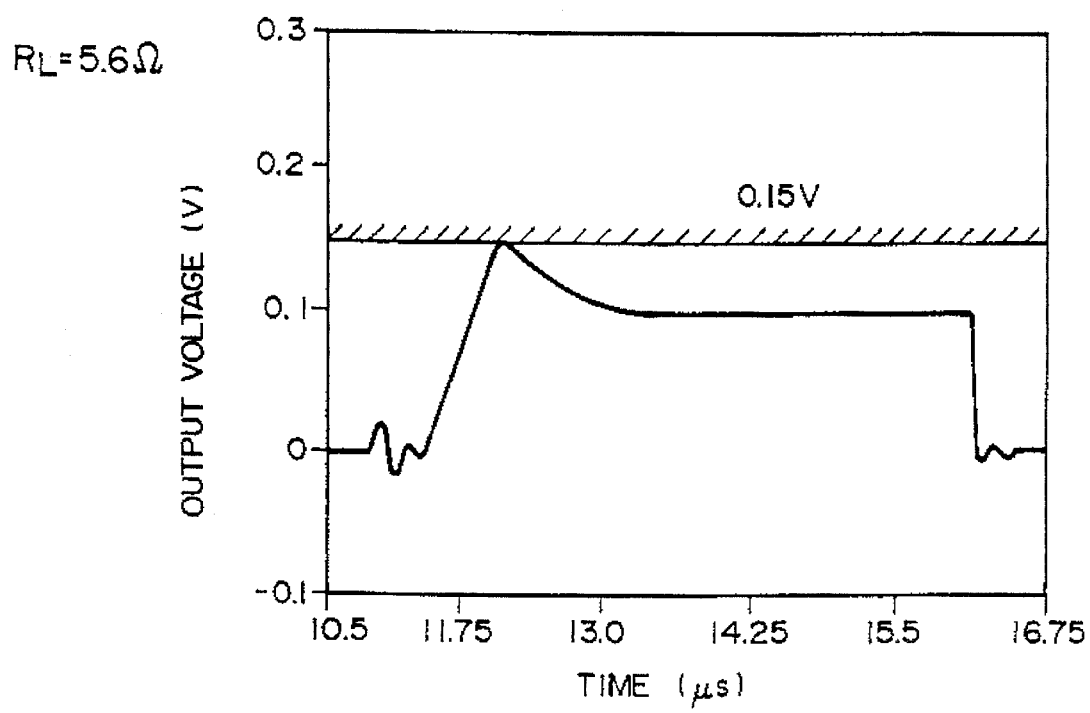
FIG. 19 is a characteristics diagram according to the results of experiments of the driving circuit.
Figure 20:
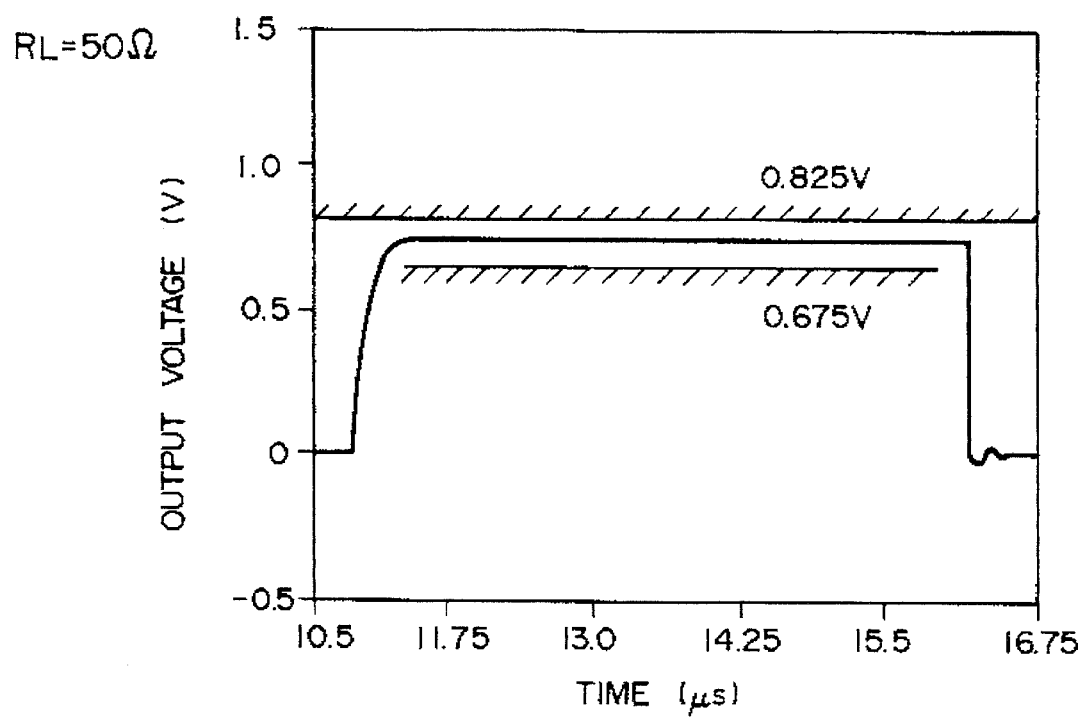
FIG. 20 is a characteristics diagram according to the results of experiments of the driving circuit.
Figure 21:
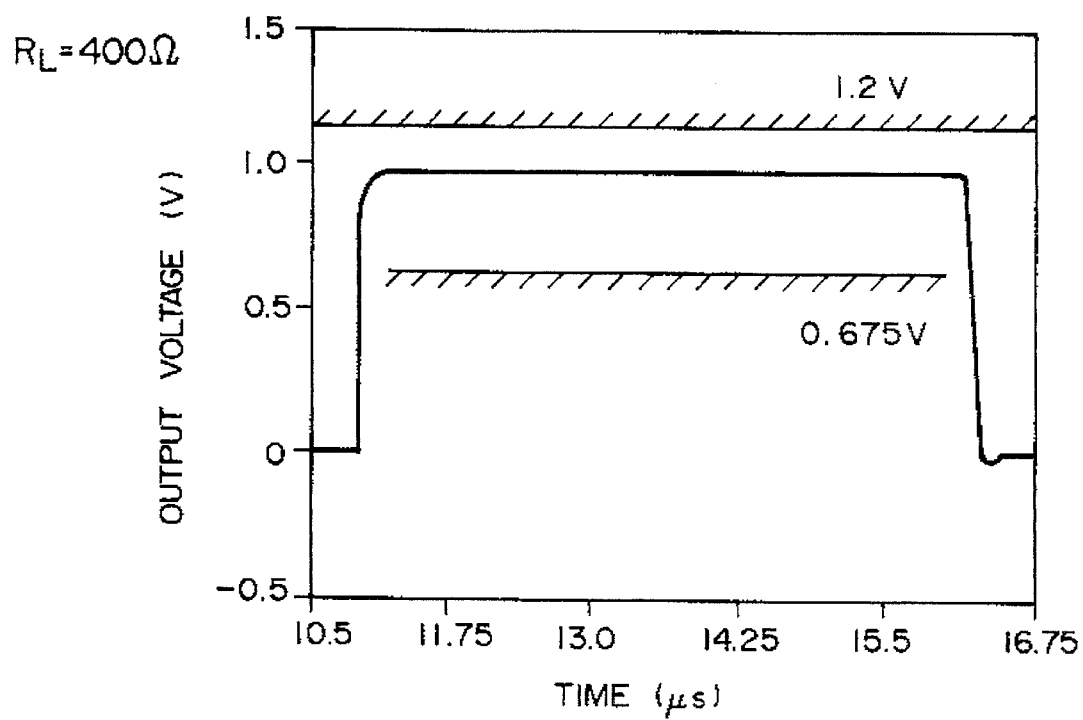
FIG. 21 is a characteristics diagram according to the results of experiments of the driving circuit.

FIGS. 19 to 21 show results of experiments of the driving circuit 22.

In each of the characteristics diagram of FIGS. 19 to 21, an axis of abscissa denotes a time (μsec) and an axis of ordinate indicates an output voltage (V). The characteristics diagram shown in FIG. 19 relates to the case where the load resistance RL is equal to 5.6 Ω. The characteristics diagram shown in FIG. 20 relates to the case where the load resistance RL is equal to 50 Ω. The characteristics diagram shown in FIG. 21 relates to the case where the load resistance RL is equal to 400 Ω. A pulse specification in the case where the load resistance RL is equal to 5.6 Ω is set to 0.15 V or less. A pulse specification in the case where the load resistance RL is equal to 50 Ω is such that a nominal pulse amplitude value is equal to 0.75 V. A pulse specification in the case where the load resistance RL is equal to 400 Ω is set to a value within a range of 0.675 to 1.2 V. Therefore, in all of the above cases, the specification of the driving circuit of the ISDN is satisfied.

According to the embodiment, the following operation and effects are obtained.

Figure 5:
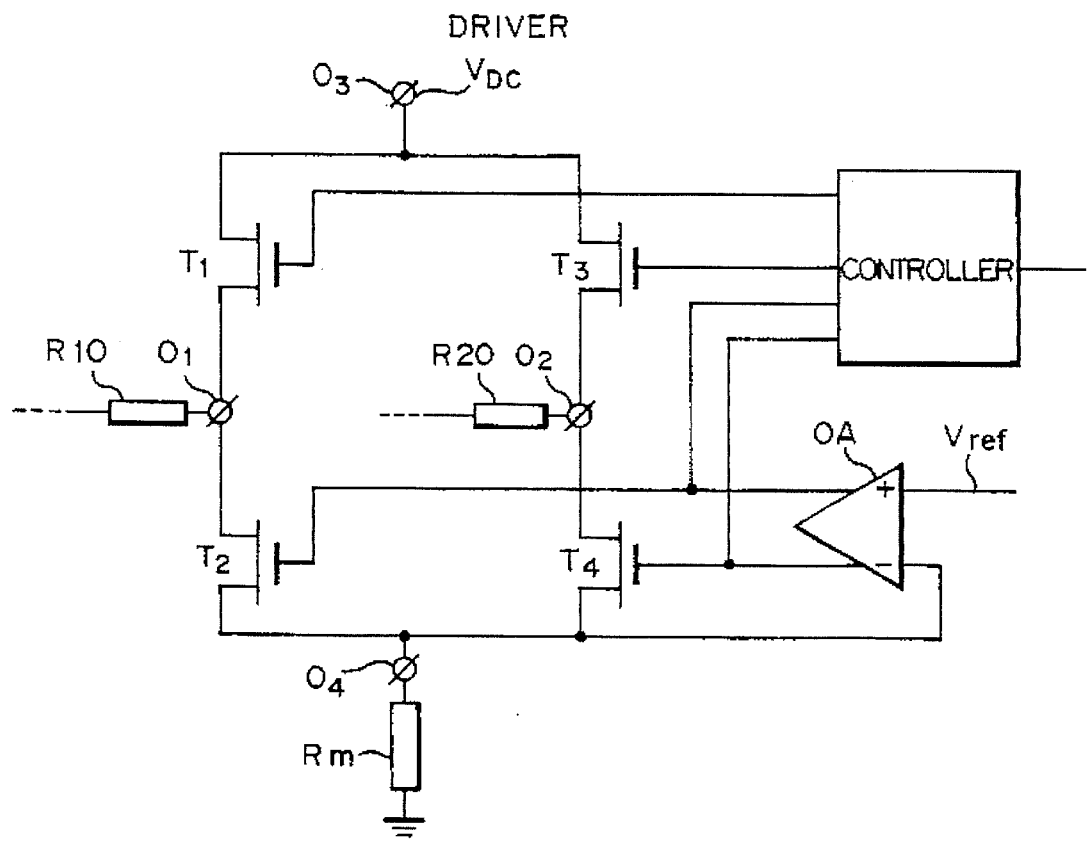
FIG. 5 is a conventional circuit diagram of the driving circuit.

(1) In the conventional circuit shown in FIG. 5, the resistor Rm for making the current constant is needed and it is necessary to externally attach such a resistor because of the necessity of the adjustment of the resistance value of such a resistor. In the embodiment, however, as shown in FIG. 16, the p-channel type MOS transistor M26 which operates as a current limiter is provided, thereby limiting the current in case of an overload (refer to FIG. 8). Since an externally attached resistor corresponding to the resistor Rm is unnecessary because of the current control, the number of parts which are externally attached can be reduced by the amount corresponding to such an unnecessary resistor.

(2) By using the reference voltage generating circuit 13 and the trimming circuit 20, stable internal power source voltage and bias circuit 23 which don't depend on variations in temperature, power source voltage, and processes can be realized. By using them, a stable internal power source buffer (operational amplifying circuit 24 in FIG. 16) with a current limiter can be realized. By supplying a current to the MOS transistors MPP, MPN, MNP, and MNN by such an internal power source, a constant voltage control is executed when the load resistance is equal to 50 Ω and 400 Ω and a current limit is executed when the load resistance is equal to 5.6 Ω. Due to this, the specification of the driving circuit of the ISDN can be satisfied. In case of an overload such that the load resistance is equal to 5.6 Ω, the current limit is performed. For instance, an electric power loss is smaller than the electric power loss in the resistors R10 and R20 at the time of the constant current control as in the case of the conventional circuit shown in FIG. 5. Therefore, the driving circuit 22 of a small electric power loss and a high efficiency can be eventually realized.

Figure 4:
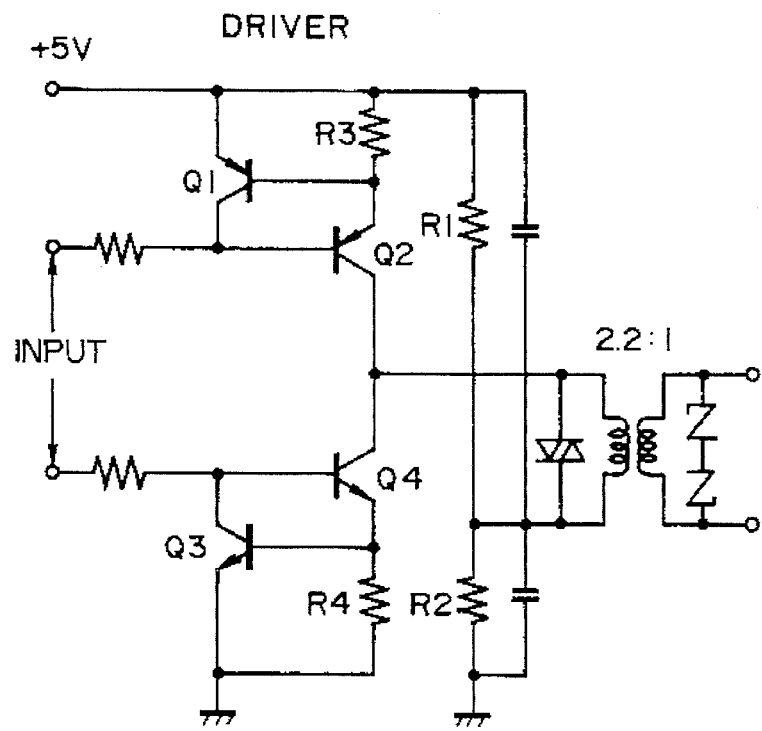
FIG. 4 is a conventional circuit diagram of a driving circuit which is included in the D/R circuit.

(3) In the conventional circuit shown in FIG. 4, the voltage at the center point is supplied by the voltage division by the resistors R1 and R2 and the electric power consumption is increased by the current flowing in such resistors R1 and R2. In the embodiment, however, as shown in FIG. 14, the output terminal LTP on the positive side is led out from the point at which the drain electrode of the p-channel type MOS transistor MPP and the drain electrode of the n-channel type MOS transistor MPN are connected. The source electrode of the n-channel type MOS transistor MPN is connected to the ground GND. The output terminal LTN on the negative side is led out from the point at which the drain electrode of the p-channel type MOS transistor MNP and the drain electrode of the n-channel type MOS transistor MNN are connected. The source electrode of the n-channel type MOS transistor MNN is connected to the ground GND. Due to such a construction, devices corresponding to the above resistors R1 and R2 for division don't exist, so that the invention is advantageous in order to decrease the electric power consumption.

(4) Further, by controlling the constant current source (p-channel type MOS transistor M26) in the operational amplifying circuit 24 in the driving circuit 22, good internal power source characteristics can be guaranteed. The operating currents of all of the analog circuits in the LSI 5 for interface are determined by such a bias circuit 23. By deciding as mentioned above, a fluctuation of the electric power consumption of the analog section is reduced, so that the characteristics are stabilized and a surplus margin design becomes unnecessary. Therefore, the invention is advantageous in order to reduce the electric power consumption of the LSI 5 for interface.

(5) Since the low electric power consumption can be accomplished as a whole LSI 5 for interface as mentioned above, the invention can be also made correspond to a station power supply through the subscriber's line. A communication terminal apparatus which is suitable for the ISDN can be formed.

Although the invention made by the present inventors has specifically been described above on the basis of the preferred embodiments, the present invention is not limited to those embodiments but many variations and modifications of the invention are possible within the purview of the invention without departing from the spirit of the invention.

For example, the two resistors RI' in FIG. 14 can be substituted by one resistor. By using such a structure, the number of external terminals can be reduced.

In the embodiment, when the transmission digital signals TAMIP/TAMIN are equal to 1/0 or when a transition from 0/1 to 0/0 occurs, the MOS transistor MR is instantaneously short-circuited, thereby suppressing the ringing. In place of such a method, however, the transistor MR can be also instantaneously fixed to a certain voltage level by the switching operation of the MOS transistor.

The invention is not limited to only the above embodiments but can be also widely applied under a condition such that the apparatus includes at least a driving element to drive the communication line.

What is claimed is:

1. A communication line driver comprising:

a reference voltage generating circuit for generating a reference voltage;

a trimming circuit for adjusting the reference voltage generated from said reference voltage generating circuit;

driving means for driving a communication line to transmit a signal to said communication line;

an internal power source buffer included in said driving means for applying a constant voltage to said driving means by a constant voltage control based on an output of said trimming circuit; and a bias circuit which generates a bias voltage for deciding an internal operating current of said internal power source buffer on the basis of the output of the trimming circuit, wherein said internal power source buffer includes a current limiter circuit biased at the bias voltage generated by said bias circuit, the current limiter circuit limiting a current which is supplied from said internal power source buffer to said driving means in an overload state in a communication line driving.

2. A driver according to claim 1, wherein said reference voltage generating circuit includes:

a depletion type field effect transistor which has a low threshold value and is formed by ion implantation;

an enhancement type field effect transistor on the output side which is differentially connected to said depletion type field effect transistor; and a current mirror circuit, and wherein said reference voltage generating circuit is connected in a manner such that a current which is proportional to the current flowing in said depletion type field effect transistor flows in said enhancement type filed effect transistor, and a voltage based on a difference between the threshold values of both of said depletion type field effect transistor and said enhancement type field effect transistor is extracted as said reference voltage.

3. A driver according to claim 1, wherein said trimming circuit includes:

an operational amplifying circuit for amplifying the output voltage of said reference voltage generating circuit; and circuit means for controlling a negative feedback amount of said amplifying circuit by information to adjust an amplification ratio of said operational amplifying circuit.

4. A driver according to claim 1, wherein said internal power source buffer includes:

a field effect transistor of a source follower connection which is provided as output stage of the current which is supplied to said driving means and;

a field effect transistor of a constant current source which is connected to a drain electrode side of said field effect transistor and forms said current limiter circuit by limiting the current flowing in said field effect transistor.

5. A driver according to claim 1, wherein said bias circuit includes a field effect transistor having a temperature compensating function to which an input reference voltage of a temperature dependency is applied, and the input reference voltage to said bias circuit is adjusted so that a negative temperature coefficient of a current amplification factor of said transistor is set off by a positive temperature coefficient as the square of a difference between a voltage between gate and source of said field effect transistor and a threshold voltage value of said temperature compensating field effect transistor.

6. A driver according to claim 1, wherein said driving means includes a plurality of field effect transistor devices and also includes a field effect transistor for short-circuiting an input terminal of a transformer at a timing at which an output terminal of said driving means is set into a high impedance state in accordance with a control signal to transmit a signal to a communication line when output terminals of said transistor devices are connected to the communication line through the transformer.

7. A communication line driver for driving a subscriber's side of a communication line in an integrated services digital network, comprising:

a reference voltage generating circuit for generating a reference voltage;

a trimming circuit for adjusting the reference voltage generated from said reference voltage generating circuit;

driving means for driving a communication line to transmit a signal to said communication line;

an internal power source buffer included in said driving means for applying a constant voltage to said driving means by a constant voltage control based on an output of said trimming circuit; and a bias circuit for generating a bias voltage for deciding an internal operating current of said internal power source buffer on the basis of the output of the trimming circuit, wherein said internal power source buffer includes a current limiter circuit biased at the bias voltage generated by the bias circuit and limiting a current which is supplied from said internal power source buffer to said driving means in an overload state in a communication line driving.

8. An LSI for a communication interface in which a communication line driver comprising a reference voltage generating circuit for generating a reference voltage, a trimming circuit for adjusting the reference voltage generated from said reference voltage generating circuit, driving means for driving a communication line to transmit a signal to said communication line, an internal power source buffer included in said driving means for applying a constant voltage to said driving means by a constant voltage control based on an output of said trimming circuit, and a bias circuit for generating a bias voltage for deciding an internal operating current of said internal power source buffer on the basis of the output of the trimming circuit, wherein said internal power source buffer includes a current limiter circuit biased at the bias voltage generated by the bias circuit and limiting a current which is supplied from said internal power source buffer to said driving means in an overload state in a communication line driving, and a receiver for receiving the signal transferred through said communication line, wherein said communication line driver and said receiver are formed on one semiconductor substrate.

9. A communication terminal apparatus including an LSI for communication interface according to claim 8.

* * * * *